(12) United States Patent
Kim et al.

(10) Patent No.: US 11,175,960 B2
(45) Date of Patent: Nov. 16, 2021

(54) WORKER-SCHEDULING METHOD IN CLOUD-COMPUTING SYSTEM AND APPARATUS FOR THE SAME

(71) Applicant: ELECTRONICS AND TELECOMMUNICATIONS RESEARCH INSTITUTE, Daejeon (KR)

(72) Inventors: Young-Ho Kim, Daejeon (KR); Chei-Yol Kim, Sejong-si (KR); Jin-Ho On, Sejong-si (KR); Su-Min Jang, Sejong-si (KR); Gyu-Il Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 180 days.

(21) Appl. No.: 16/583,504

(22) Filed: Sep. 26, 2019

(65) Prior Publication Data
US 2020/0183744 A1  Jun. 11, 2020

(30) Foreign Application Priority Data

Dec. 5, 2018 (KR) .................. 10-2018-0155383
Sep. 6, 2019 (KR) .................. 10-2019-0110622

(51) Int. Cl.
*G06F 9/46* (2006.01)
*G06F 9/50* (2006.01)
*H04L 29/08* (2006.01)

(52) U.S. Cl.
CPC .............. *G06F 9/505* (2013.01); *H04L 67/10* (2013.01); *G06F 2209/5019* (2013.01)

(58) Field of Classification Search
CPC ............ G06F 9/505; G06F 2209/5019; G06F 9/5072; G06F 9/5077; H04L 67/10;
(Continued)

(56) References Cited

U.S. PATENT DOCUMENTS 9,678,793 B2   6/2017 Kumar et al.
9,866,433 B1 * 1/2018 Fakhouri ................. H04L 67/10
(Continued)

FOREIGN PATENT DOCUMENTS

KR   10-2016-0136489 A   11/2016
KR   10-2018-0097904 A    9/2018

OTHER PUBLICATIONS

Abad, Cristina et al. "Package-Aware Scheduling of FaaS Functions". HotCloudPerf Workshop. ICPE'18 Companion, Apr. 9-13, 2018, Berlin, Germany. (Year: 2018).*

*Primary Examiner* — Adam Lee
(74) *Attorney, Agent, or Firm* — LRK Patent Law Firm

(57) ABSTRACT

A method and apparatus are disclosed which relate generally to worker-scheduling technology in a serverless cloud-computing environment, and more particularly, to technology that allocates workers for executing functions on a micro-function platform which provides a function-level micro-service. The method and apparatus process a worker allocation task in a distributed manner as two-step pre-allocation schemes before a worker allocation request occurs, and pre-allocates workers required for a service using a function request period and a function execution time, thus minimizing scheduling costs incurred by worker allocation requests.

16 Claims, 17 Drawing Sheets

TEMPLATE WORKER LIST     READY WORKER INACTIVE LIST     ACTIVE WORKER LIST

(58) Field of Classification Search
CPC ............ H04L 67/1004; H04L 67/1029; H04L 67/1008; H04L 67/32
See application file for complete search history.

(56) References Cited

U.S. PATENT DOCUMENTS

| | | | |
|---|---|---|---|
| 10,055,262 B1* | 8/2018 | Thomas | G06F 9/5083 |
| 10,402,090 B1* | 9/2019 | Tsaur | G06F 3/0604 |
| 10,782,990 B1* | 9/2020 | Suarez | G06F 9/5005 |
| 2012/0209901 A1* | 8/2012 | Xu | H04L 67/32 |
| | | | 709/201 |
| 2016/0092252 A1* | 3/2016 | Wagner | G06F 9/45558 |
| | | | 718/1 |
| 2017/0289059 A1* | 10/2017 | Wu | H04L 67/325 |
| 2017/0373940 A1* | 12/2017 | Shahab | H04L 47/70 |
| 2018/0109501 A1* | 4/2018 | Pawgi | H04L 63/0428 |
| 2018/0143856 A1* | 5/2018 | Du | G06F 9/5011 |
| 2018/0146067 A1* | 5/2018 | Du | G06F 9/4881 |
| 2018/0336076 A1 | 11/2018 | Lim et al. | |
| 2018/0349313 A1 | 12/2018 | Ahn et al. | |
| 2018/0375787 A1* | 12/2018 | Chen | G06F 9/4843 |
| 2019/0004725 A1* | 1/2019 | Shah | G06F 3/0647 |
| 2019/0028537 A1* | 1/2019 | Krishna Singuru | H04L 47/127 |
| 2019/0042331 A1* | 2/2019 | McDonnell | G06F 1/3287 |
| 2019/0050258 A1* | 2/2019 | Kim | G06F 9/5011 |
| 2019/0155868 A1* | 5/2019 | Largo Del Amo | |
| | | | H04L 67/2823 |
| 2020/0007388 A1* | 1/2020 | Johnston | H04L 45/306 |
| 2020/0133728 A1* | 4/2020 | Nataraj | G06F 9/4881 |
| 2021/0149742 A1* | 5/2021 | Turanyi | G06F 8/61 |

\* cited by examiner

WORKER-SCHEDULING METHOD IN CLOUD-COMPUTING SYSTEM AND APPARATUS FOR THE SAME

CROSS REFERENCE TO RELATED APPLICATIONS

This application claims the benefit of Korean Patent Application Nos. 10-2018-0155383, filed Dec. 5, 2018, and 10-2019-0110622, filed Sep. 6, 2019, which are hereby incorporated by reference in their entireties into this application.

BACKGROUND OF THE INVENTION

1. Technical Field

The present invention relates generally to worker-scheduling technology in a serverless cloud-computing environment, and more particularly, to technology that allocates workers for executing functions on a micro-function platform which provides a function-level micro-service.

2. Description of Related Art

Recently, Artificial Intelligence (AI) is emerging as a hot trend in Information Technology (IT) fields owing to Google DeepMind's Artificial Intelligence (AI) AlphaGo. The computing power of this AlphaGo was able to be achieved thanks to a distributed cloud-computing-based infrastructure that is capable of implementing machine learning. As AI workloads ranging from automatic driving and customized medical fields to super-human speech recognition have become popular in the cloud, optimal performance and flexibility may be provided to almost all accelerated workloads including most deep learning/training, reasoning, advanced analytics, and high-performance computing.

Cloud computing refers to technology that allows an additional computer connected via a network, rather than a user's actual computer or server, to process data through virtualization. Google DeepMind utilizes the widespread Google cloud platform so that researchers who conduct research into artificial intelligence and machine learning can use computing, storage space, or networking technology whenever such computing, storage space, or networking technology is required. Another stronger AI system, namely the IBM cognitive computing system Watson, is also operated based on cloud computing. Jeopardy, which was IBM's initial AI, was developed at the time at which cloud-computing technology was not commercialized, and was implemented on a single conventional server, but since Watson, computing systems have switched to cloud computing. Actually, IBM has now established an enterprise hybrid cloud service based on Watson.

A Function as a Service (FaaS) has come to be widely utilized in cloud-computing fields with the development of the cloud-computing paradigm and an increase in the demand for event-based computing models. Workers that execute functions on a FaaS computing platform may perform a process for loading a function from lightweight virtual environment instances, such as the container of a computing node, executing the corresponding function, and returning the results of processing resulting from function execution.

Here, worker scheduling is a process for searching for a computing node having optimal resources to execute the function and for preparing a function execution environment, and is composed of the following three steps. First, a computing node having optimal resources for creating workers is selected and is allocated. Second, the allocated computing node creates and initializes a lightweight virtual environment instance, such as a container. Finally, a function, a related package, and a library file are loaded from a repository into a worker instance. In the case of initial allocation, the above three steps must be performed before a worker is allocated. However, when there is a worker that has executed a function and has been deallocated, the corresponding worker may be used again, in which case a worker allocation response time is shortened and allocation response is processed at minimal cost.

A scheduler in an existing FaaS computing platform processes the allocation of workers based on two-step worker states, as illustrated in FIGS. 1 and 2. For example, when a worker scheduler performs a task for allocating computing nodes and resources, the computing node performs a task for creating and initializing physical worker instances and for loading and preparing a function to be executed.

Here, FIG. 2 illustrates the results of analyzing preparation loads required for actual execution of a function from the allocation of a function execution worker to the loading of the function on a FaaS platform by testing the execution of the function in a FaaS prototype so as to check the cost of two-step worker state-based worker scheduling. Referring to FIG. 2, it can be seen that, even if a lightweight container is used, a worker creation cost of 1,750 ms is required for initial worker allocation and a worker creation cost of 470 ms is required when the same node subsequently reallocates the worker. In this way, the worker allocation process requires a lot of time for initial creation and activation of a lightweight virtualization container, which is a physical worker instance. Therefore, a problem may arise in that processing the worker allocation at the time point at which worker allocation is requested further delays the execution of the corresponding function.

That is, a two-step worker state-based worker-scheduling algorithm may cause problems in that the proportion of the initial worker creation cost in worker allocation is excessively large and in that the execution time of a short-term function requiring fast processing is increased. Also, when the load of function service requests rapidly increases or varies excessively, consecutive allocation requests may occur before the execution of a previously created worker is terminated. In this case, a request-based worker creation scheme increases an allocation response time and makes it difficult to rapidly process worker allocation for a function service.

PRIOR ART DOCUMENTS

Patent Documents (Patent Document 1) Korean Patent Application Publication No. 10-2016-0136489, Date of Publication: Nov. 30, 2016 (Title: Method for Resource Management base of Virtualization for Cloud Service)

SUMMARY OF THE INVENTION

Accordingly, the present invention has been made keeping in mind the above problems occurring in the prior art, and an object of the present invention is to provide worker-scheduling technology that rapidly allocates container-based workers that perform a function service, and that minimizes response costs.

Another object of the present invention is to provide worker-scheduling technology that can actively respond to variation in the load of function service requests and can minimize an allocation latency for a short-term function service requiring a fast response speed.

A further object of the present invention is to provide new worker-scheduling technology that suitably distributes execution preparation loads of workers related to the execution of a function in advance, thus making a FaaS platform more suitable for a real-time processing environment.

Yet another object of the present invention is to process a worker allocation task in a distributed manner as two-step pre-allocation schemes before a worker allocation request occurs, and to pre-allocate workers required for a service using a function request period and a function execution time, thus minimizing scheduling costs incurred by worker allocation requests.

Still another object of the present invention is to provide a worker scheduler having greatly improved worker allocation costs, which is applicable to systems requiring a resource-isolation virtual cloud infrastructure service and to a medical AI-specialized training/inferencing platform shared by multiple institutions.

In accordance with an aspect of the present invention to accomplish the above objects, there is provided a worker-scheduling method in a cloud-computing system, including performing a first load-distribution operation of pre-creating template workers so as to process worker execution preparation loads in a distributed manner before a worker allocation request for function execution occurs; predicting a number of workers to be pre-allocated in consideration of variation in a worker allocation request period for each function; and performing a second load distribution operation of pre-allocating ready workers by performing worker upscaling on as many template workers as the number of workers to be pre-allocated.

The worker-scheduling method may further include, when the worker allocation request for function execution occurs, allocating the ready workers as active workers, and changing states of deallocated ready workers in consideration of a function service request load.

The worker-scheduling method may further include initializing ready workers that are not used during a preset idle time, among pre-allocated ready workers, to the template workers by performing worker downscaling on the ready workers that are not used during the preset idle time.

Each of the template workers may correspond to a temporary worker configured in accordance with a base-runtime image and a minimal resource capacity so that the template worker is capable of being used in common in all functions.

Each of the ready workers may correspond to a worker in a function-execution-ready state, in which setting of resource information for function execution and allocation of a resource have been completed.

Each of the ready workers may have a state corresponding to any one of an active ready state, in which allocation of a resource and loading of a function file are completed, and an inactive ready state, in which a resource is not allocated, but loading of a function file is completed.

The worker-scheduling method may further include, when an active worker usage ratio is greater than a preset active upper reference value, performing ready worker upscaling of changing the template workers to the ready workers; and when the active worker usage ratio is less than a preset active lower reference value, changing a state of a ready worker in the active ready state to the inactive ready state.

The active worker usage ratio may be a ratio of a number of active workers to a sum of numbers of ready workers in the active ready state and active workers.

The worker-scheduling method may further include, when an inactive worker ratio is greater than a preset inactive upper reference value, performing ready worker downscaling of changing a ready worker in the inactive ready state to a template worker.

The worker-scheduling method may further include, when a number of template workers is less than or equal to a preset allowable limit to a maximum number of creatable workers, additionally creating the template workers by performing template worker upscaling in a background.

The worker allocation request period for each function may be calculated based on a number of workers required to be allocated during a unit time for each function, and the number of workers to be pre-allocated may correspond to a value obtained by subtracting a number of ready workers in the active ready state and a number of active workers from the number of workers required during the unit time for each function.

The number of workers required during the unit time for each function may correspond to a value obtained by dividing an average execution time of workers that execute the corresponding function by the worker allocation request period for each function.

In accordance with another aspect of the present invention to accomplish the above objects, there is provided a worker-scheduling apparatus in a cloud-computing system, including a processor for pre-creating template workers so as to process worker execution preparation loads in a distributed manner before a worker allocation request for function execution occurs, predicting a number of workers to be pre-allocated in consideration of variation in a worker allocation request period for each function, and pre-allocating ready workers by performing worker upscaling on as many template workers as the number of workers to be pre-allocated; and a memory for storing a worker pool that manages workers for function execution.

The processor may be configured to, when the worker allocation request for function execution occurs, allocate the ready workers as active workers, and change states of deallocated ready workers in consideration of a function service request load.

The processor may initialize ready workers that are not used during a preset idle time, among pre-allocated ready workers, to the template workers by performing worker downscaling on the ready workers that are not used during the preset idle time.

Each of the template workers may correspond to a temporary worker configured in accordance with a base-runtime image and a minimal resource capacity so that the template worker is capable of being used in common in all functions.

Each of the ready workers may correspond to a worker in a function-execution-ready state, in which setting of resource information for function execution and allocation of a resource have been completed.

Each of the ready workers may have a state corresponding to any one of an active ready state, in which allocation of a resource and loading of a function file are completed, and an inactive ready state, in which a resource is not allocated, but loading of a function file is completed.

The processor may be configured to, when an active worker usage ratio is greater than a preset active upper reference value, perform ready worker upscaling of changing the template workers to the ready workers, and when the active worker usage ratio is less than a preset active lower reference value, change a state of a ready worker in the active ready state to the inactive ready state.

The active worker usage ratio may be a ratio of a number of active workers to a sum of numbers of ready workers in the active ready state and active workers.

The processor may be configured to, when an inactive worker ratio is greater than a preset inactive upper reference value, perform ready worker downscaling of changing a ready worker in the inactive ready state to a template worker.

The processor may be configured to, when a number of template workers is less than or equal to a preset allowable limit to a maximum number of creatable workers, additionally create the template workers by performing template worker upscaling in a background.

The worker allocation request period for each function may be calculated based on a number of workers required to be allocated during a unit time for each function, and the number of workers to be pre-allocated may correspond to a value obtained by subtracting a number of ready workers in the active ready state and a number of active workers from the number of workers required during the unit time for each function.

The number of workers required during the unit time for each function may correspond to a value obtained by dividing an average execution time of workers that execute the corresponding function by the worker allocation request period for each function.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
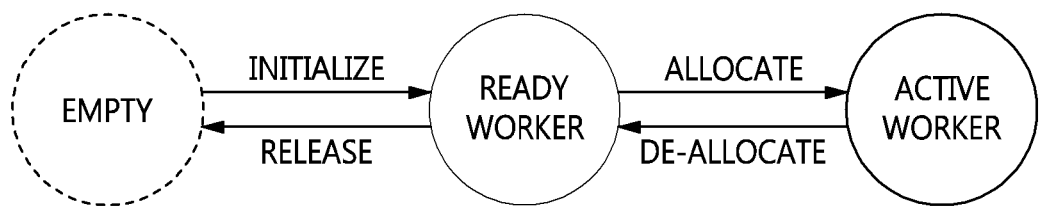
FIGS. 1 and 2 are diagrams illustrating examples of two-step worker allocation state transition and execution cost analysis.
Figure 2:
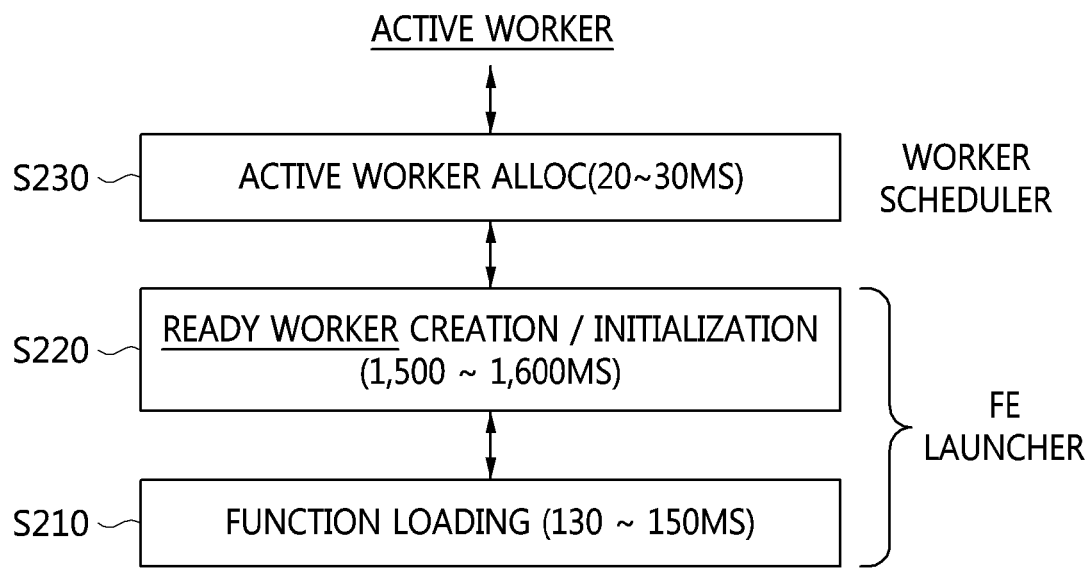

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, embodiments of the present invention will be described in detail with reference to the attached drawings.

Figure 3:
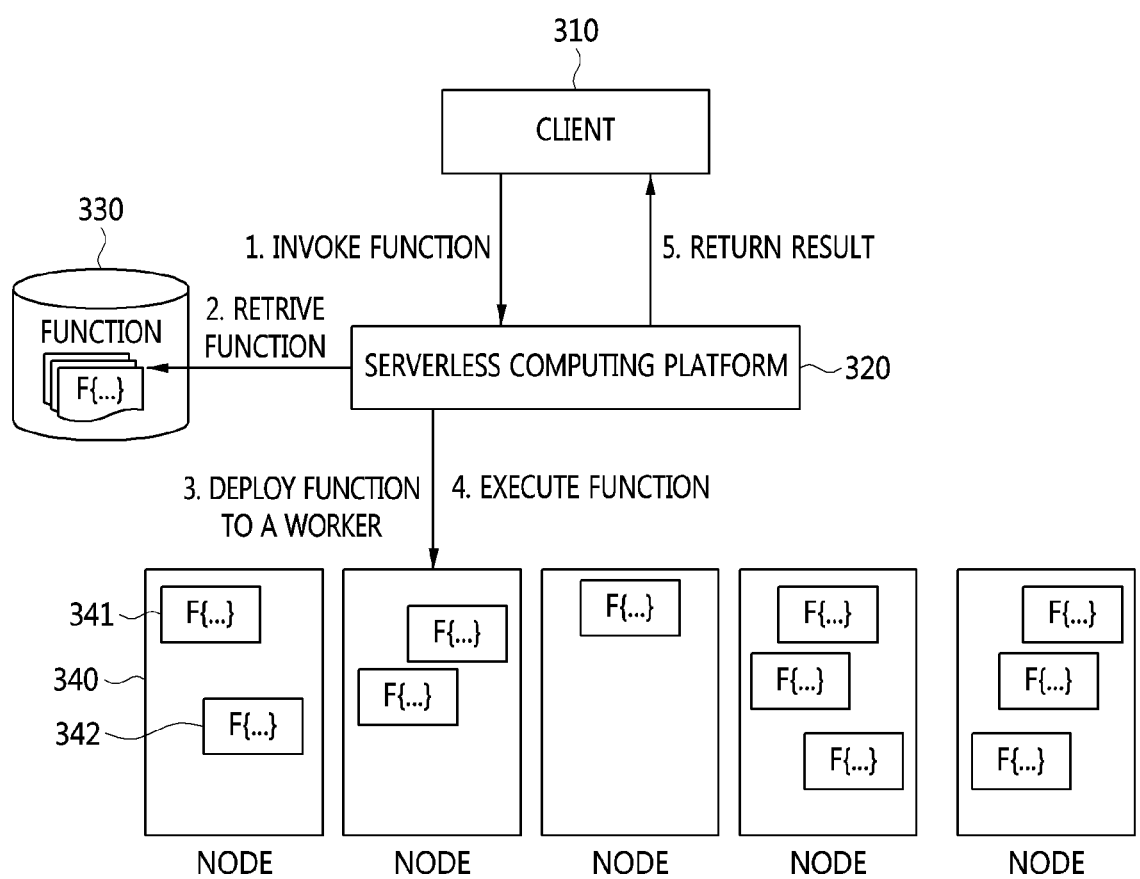
FIG. 3 is a diagram illustrating an example of a micro-function service platform system according to the present invention.

FIG. 3 is a diagram illustrating an example of a micro-function service platform system according to the present invention.

Referring to FIG. 3, a serverless computing platform system to which a function service is provided according to the present invention includes a client 310, a serverless computing platform 320, a repository 330, and computing nodes 340.

The client 310 is an application or a web console, and is a consumer that requests a function service from the serverless computing platform 320 and receives the result of the request. A function file, a related library, and a package may be stored and managed in the repository 330.

Each computing node 340 may refer to a physical resource on which a function is actually executed using container instances called workers 341 and 342 to which physical computing resources, that is, a Central Processing Unit (CPU), memory, etc., are allocated.

Here, the performance of a function service via function invocation on the serverless computing platform system may be implemented using the following procedure.

First, the client 310 may invoke a function service request through an interface, such as a Representational State Transfer Application Programming Interface (REST API), to the serverless computing platform 320.

Thereafter, the serverless computing platform 320 may retrieve the invoked function from the repository 330.

Next, the serverless computing platform 320 may allocate the workers 341 and 342 using both resource information required for function execution and current allocation state information.

Then, a deployment task for loading functions to be executed on the workers 341 and 342 allocated to the computing node 340 and loading a library and a package required for execution may be performed.

Thereafter, the workers 341 and 342 may execute the functions, and may return the result of processing the function service to the client 310 through the serverless computing platform 320.

Figure 4:
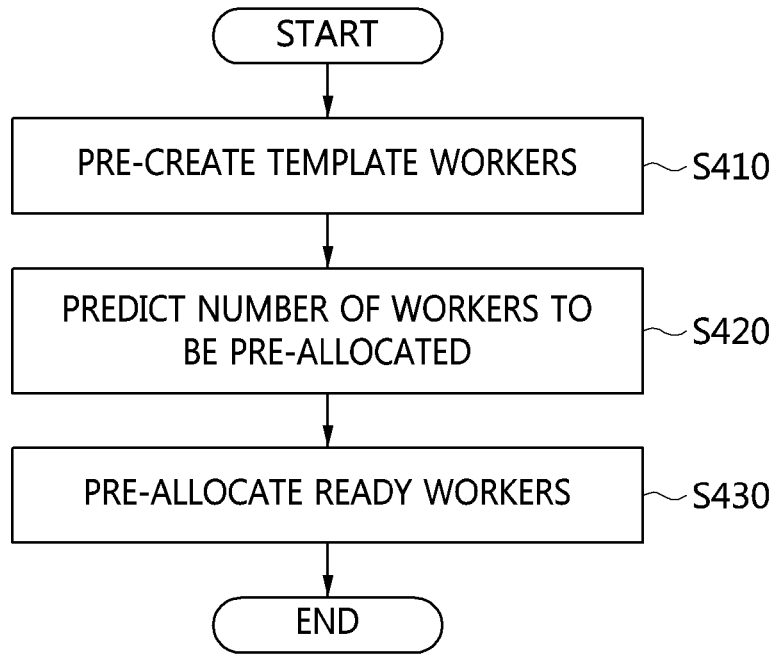
FIG. 4 is an operation flowchart illustrating a worker-scheduling method in a cloud-computing system according to an embodiment of the present invention.

FIG. 4 is an operation flowchart illustrating a worker-scheduling method in a cloud-computing system according to an embodiment of the present invention.

Referring to FIG. 4, the worker-scheduling method in the cloud-computing system according to the embodiment of the present invention pre-creates template workers so as to process worker execution preparation loads in a distributed manner before a worker allocation request for executing a function occurs at step S410.

Here, the present invention is intended to propose a three-step worker instance-based worker-scheduling algorithm through two-step worker pre-allocation in order to solve the problem of two-step worker instance-based worker scheduling in which a response execution time is lengthened depending on initial worker allocation and load variation.

First, each worker may be a high-level logical resource, which corresponds to a container object of a computing node for executing a micro-function, and may be allocated computing resources of an actual physical node at an allocation step for function execution. Here, each worker according to an embodiment of the present invention may correspond to a basic unit for scheduler allocation and scaling, and may be classified into three steps, as illustrated in FIG. 5.

Figure 5:
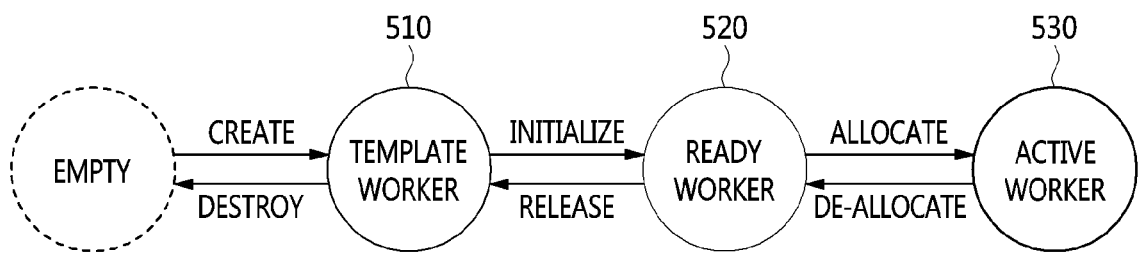
FIGS. 5 and 6 are diagrams illustrating examples of three-step worker allocation state transition and execution cost analysis according to the present invention.
Figure 6:
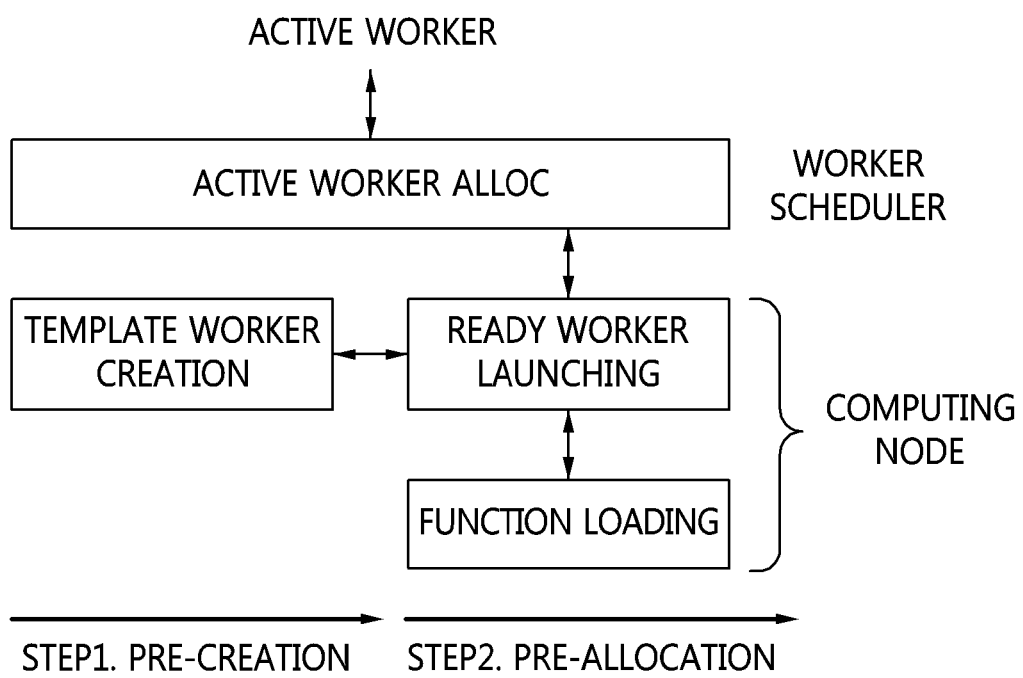

Referring to FIGS. 5 and 6, a template worker 510 may be a temporary worker in a middle step, which is configured in accordance with a base-runtime image and minimal resource capacity so that the template worker can be used in common in all functions. In the present invention, the template worker may be utilized for pre-creation which supports fast worker allocation processing and load variation processing through the distribution of worker allocation and initialization times, as illustrated in FIG. 6.

A procedure for creating the template worker 510 may correspond to a worker creation procedure which requires a lot of execution time in two-step worker instance-based worker scheduling, but may be performed when worker scheduling initially begins or when the number of template workers decreases below a predetermined ratio, rather than being performed when a worker allocation request occurs. That is, in the present invention, a worker creation procedure, which occupies an execution time of 70 to 80% of the worker allocation and initialization procedure, may be implemented at the template worker creation step.

Here, when the number of template workers is less than or equal to a preset allowable limit to the maximum number of creatable workers, a template worker may be additionally created by performing template worker upscaling in the background.

For example, template worker upscaling may be performed such that a number of template workers corresponding to about 20% of the maximum number of workers creatable by all computing nodes of the system are gradually created. At this time, since template worker upscaling is performed in the background and such a template worker is a temporary worker that is pre-created regardless of workers that are executing functions, the template worker can be efficiently operated so that the execution of functions is not delayed, or so that a load is not imposed.

Therefore, when a normal worker allocation request is received, only a procedure for changing a pre-created template worker to a ready worker needs to be performed through the setting of resource information and the loading of a function, and thus a response to the worker allocation request may be made only at an execution cost of about 15 to 20% of the existing cost.

Also, the worker-scheduling method in the cloud-computing system according to the embodiment of the present invention predicts the number of workers to be pre-allocated in consideration of variation in a worker allocation request period for each function at step S420.

Here, the present invention relates to worker-scheduling technology that actively responds to a function service request load, and may determine whether to perform worker scaling for managing workers that will execute the function through variation in a worker allocation request period, rather than a worker allocation request.

For example, when the worker allocation request period becomes shorter than the function execution time, the number of workers may be dynamically increased in a ready state, in which the function can be executed through worker scaling. For this operation, the number of workers required for scaling, that is, the number of workers to be pre-allocated, may be calculated using the function execution time and a function service request period, and the time point at which worker scaling is needed may be determined by means of the ratio of the number of workers that are actually executing the function to the number of allocation-ready workers.

By means of the worker scheduling based on such a method, workers for executing functions are prepared in advance, and thus the response time to a worker allocation request may be improved.

In this case, the worker allocation request period for each function may be calculated based on the number of workers required to be allocated during a unit time for each function.

Figure 10:
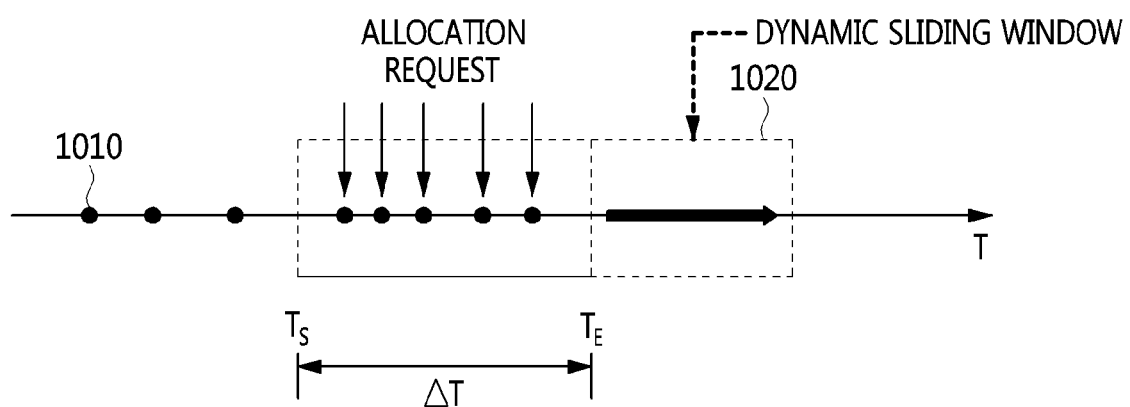
FIG. 10 is a diagram illustrating an example of a unit time interval according to the present invention.

For example, referring to FIG. 10, a worker allocation request period Tf for each function may be calculated based on a dynamic sliding window (i.e., a Dynamic flexible Sliding Window: DSW). Here, a dynamic sliding window 1020 illustrated in FIG. 10 may denote a unit time interval $\Delta t$ indicating a unit time for each function, and the worker allocation request period for each function may be calculated using the number of worker allocation requests 1010 within the unit time interval $\Delta t$.

Here, the unit time interval $\Delta t$ may be dynamically and flexibly varied for each function. That is, when there are many worker allocation requests 1010, the unit time interval $\Delta t$ through the dynamic sliding window may be reduced to half. Further, when there are no worker allocation requests 1010 during the unit time interval $\Delta t$, the corresponding interval may be gradually increased twice. Here, the maximum value of the unit time interval $\Delta t$ may correspond to the timeout value of a short-term execution function.

Also, the worker-scheduling method in the cloud-computing system according to the embodiment of the present invention pre-allocates ready workers by performing worker upscaling on as many template workers as the number of workers to be pre-allocated at step S430.

Referring to FIGS. 5 and 6, each ready worker 520 may be a worker in a function-execution-ready state, for which the setting of resource information for function execution and the allocation of resources have been completed. That is, the ready worker may be a worker at the step at which the worker is allocated to the function, and may be a worker at an execution-ready step in which the function to be actually executed is loaded.

Further, an active worker 530 illustrated in FIG. 5 may be a worker that actually executes the function after having been allocated by the scheduler, and may also mean a worker in which the ready worker 520 is in an active running state (or an active run state), which will be described later.

Figure 7:
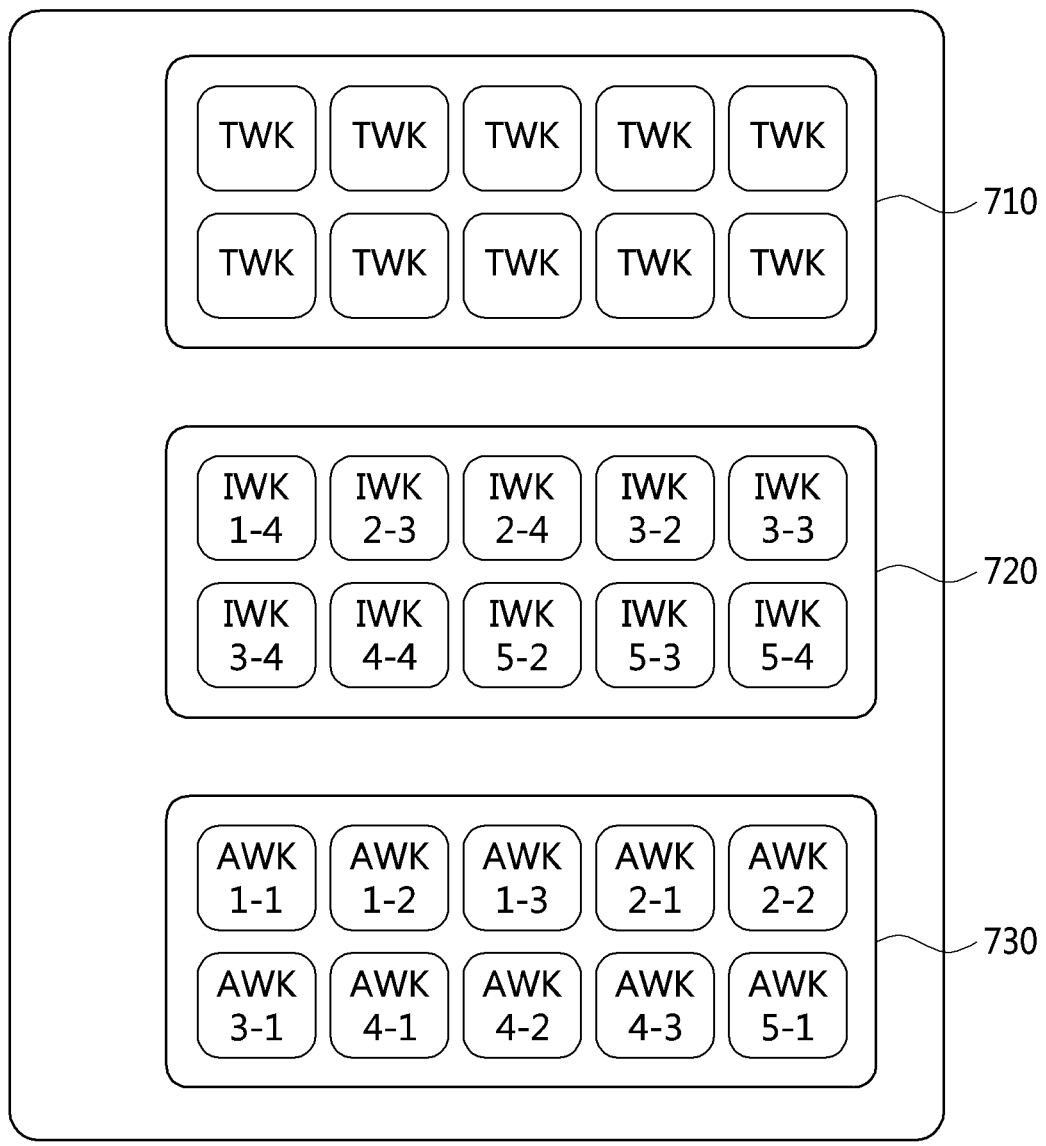
FIG. 7 is a diagram illustrating an example of a worker pool according to the present invention.

Here, the workers of the present invention illustrated in FIG. 5 may constitute separate lists for respective worker instance types, and all of the lists may be managed as a single worker pool, as illustrated in FIG. 7.

Referring to FIG. 7, the worker pool according to an embodiment of the present invention may be generated when the worker scheduler or a worker-scheduling apparatus is activated, and in the beginning, only a template worker list 710 may be present.

Here, the configuration of nodes and information about resources may be registered in response to a node registration request received from a node agent provided in each computing node. Also, the number of template workers that can be created in the computing node may be set depending on memory capacity, among pieces of resource information of the nodes, and in the beginning, a number of template workers corresponding to about 30% of the total number of workers that can be created in the node may be created and added to the worker pool.

Further, although not illustrated in FIG. 4, the worker-scheduling method in the cloud-computing system according to the embodiment of the present invention may allocate a ready worker as an active worker in response to the worker allocation request for function execution, and may change the state of a deallocated ready worker in consideration of a function service request load.

For example, referring to FIG. 7, template workers TWK included in a template worker list 710 may be changed to ready workers in response to a worker allocation request.

Here, the state of each ready worker may be any one of an active ready state, in which the allocation of resources and loading of a function file have been completed, and an inactive ready state, in which resources are not allocated, but the loading of a function file has been completed.

That is, the active ready state may indicate a worker instance in a standby state in which a worker is not allocated, but a ready state must be maintained in consideration of the condition of a function service request load. Further, the inactive ready state may indicate the state of a worker instance in which a deallocated ready worker is to be maintained until the deallocated ready worker is completely unnecessary.

For example, execution time costs required in order to change from a template worker to a ready worker may be considered to be lower than the cost required for creation of the template worker, but an execution time of 10 to 15% is still required. However, variation between the active state and the inactive state of the ready worker merely corresponds to a task for changing an active ready list 730, an inactive ready list 720, and a state flag illustrated in FIG. 7, and thus hardly any execution time is required.

That is, in order to minimize the situation in which the template worker changes to the ready worker when a worker allocation request for the function is received, the present invention may apply a lazy deallocation scheme in which a worker, created as a ready worker, is maintained even in the situation in which the worker is not used, thus minimizing worker allocation cost.

Here, the present invention may change and manage worker instances so that execution costs incurred by the actual worker allocation request are minimized by performing anticipative worker allocation and deallocation through worker scaling, which depends on the present usage state of supported system resources, a present worker available state, and variation in a worker allocation request load.

Here, the worker scheduling according to an embodiment of the present invention may mean a processing procedure for creating, changing or destroying a plurality of workers when a specific condition or situation is satisfied.

Figure 8:
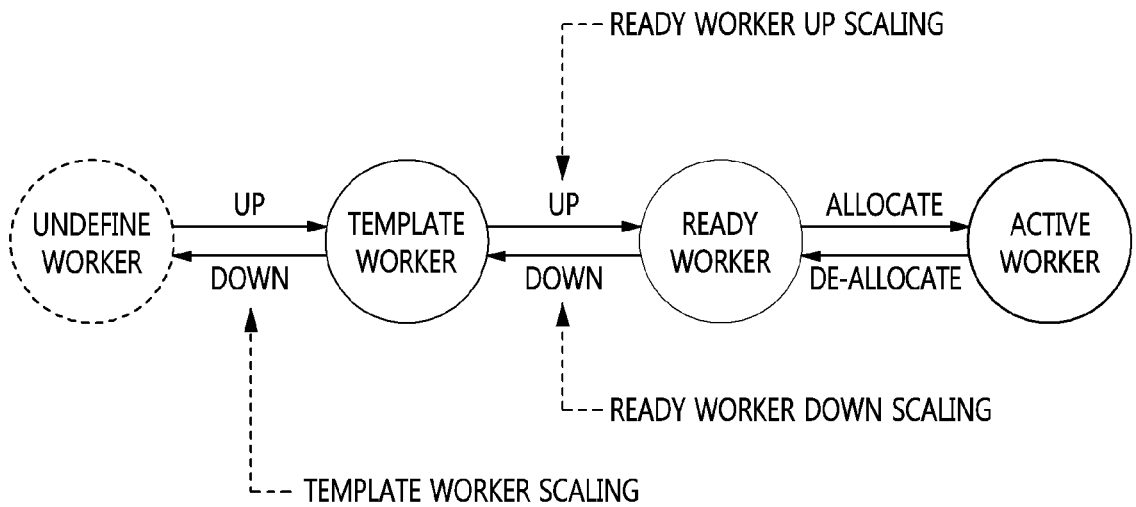
FIG. 8 is a diagram illustrating an example of worker instance transition according to the present invention.

For example, referring to FIG. 8, worker scheduling according to an embodiment of the present invention may be classified into template worker scaling, which creates or destroys a plurality of template workers, ready worker upscaling, which changes a plurality of template workers to ready workers, and ready worker downscaling, which changes ready workers back to template workers.

Here, template worker scaling may be a procedure for processing pre-allocation (upscaling) or deallocation (downscaling) of template workers in order to cancel the total worker creation cost, corresponding to 70 to 80% of the total worker allocation cost in template worker scaling. Here, each template worker may indicate a worker to which an image and minimum resources that can be used in common by all workers are allocated. When the template worker availability of the system is decreased below a threshold, a template worker may be pre-allocated via template worker scaling. At this time, a number of initial template workers corresponding to about 20% of the total number of workers creatable in the entire system may be created at after a worker pool has been created. For example, template worker scaling may be performed in such a way as to add or delete a template worker from the corresponding template worker list managed by the worker pool by creating or destroying template workers in the computing node.

Here, ready worker upscaling may be a procedure for increasing the number of ready workers to anticipatively respond to a function service request. Here, ready worker upscaling may be performed based on a function allocation request period so as to guarantee a fast response speed and a short execution time in response to the worker allocation request. For example, a task for changing a template worker to a ready worker that is capable of executing a function and for adding the ready worker to a ready worker list may be performed.

Here, ready worker downscaling may correspond to a procedure for initializing ready workers in an inactive ready state, which are allocated to a specific function and are not used for a long period of time, and then changing the ready workers to template workers that are usable in response to another function allocation request. For example, function resource setting and loading information of the ready workers in the inactive ready state may be initialized, so that the ready workers may be changed to template workers, and the changed template workers may be added to the template worker list.

Figure 9:
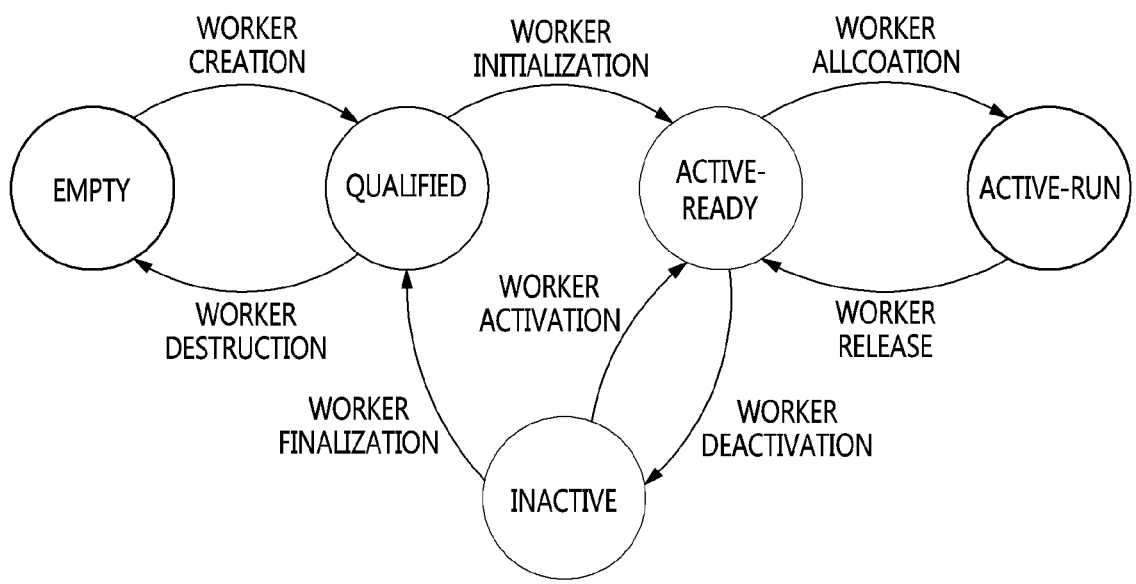
FIG. 9 is a diagram illustrating an example of worker state transition according to the present invention.

Here, the worker-scheduling method according to the embodiment of the present invention may manage the states of various workers, as illustrated in FIG. 9, in the worker scaling and worker allocation and deallocation procedures, and may change the states of workers in response to a request depending on function execution or variation in conditions.

For example, referring to FIG. 9, among five states of workers, an empty state may literally mean the state in which there is no worker.

Also, a qualified state illustrated in FIG. 9, which indicates the state in which a worker is created as a base-runtime image, may indicate a template worker or the state in which resource allocation is not performed, but only a physical container is created in the corresponding node. The template worker in this state may be created through template worker scaling, or may be created by changing the ready worker in an inactive ready state to a template worker through ready worker downscaling.

Also, an inactive ready state illustrated in FIG. 9 may correspond to the state that the ready worker, which has been allocated to and used by a function, can have, and may indicate the state in which resource allocation is not performed but a function is loaded.

That is, a significant portion of worker allocation cost may be proactively processed through template worker scaling, but execution cost corresponding to 15 to 20% of the worker allocation cost is incurred even during the procedure for changing between a template worker and a ready worker. As a result, the problem related to the delay of a response time to worker allocation may still remain unsolved. However, during the procedure for changing a ready worker in an inactive ready state to an active ready state, separate costs are not incurred. Thus, a fast response to a worker allocation request may be returned by maintaining the ready worker, which is not currently used, in an inactive state without immediately changing the ready worker to a template worker.

Also, the active ready state may indicate the state in which the allocation of resources and the loading of a function file are completed and the execution of a function is available. At this time, a template worker may be changed to a ready worker through ready worker upscaling, or alternatively, a ready worker in an active ready state may be created by changing the state of the ready worker in the inactive ready state.

Further, an active running state may indicate the state in which the worker is actually executing a function, and in which the ready worker in the active ready state may be changed to the active running state in response to a worker allocation request.

In this way, worker creation and initialization at the worker allocation step may be separated and processed as separate tasks, thus reducing a response time delay overhead in the worker allocation task. That is, a worker creation procedure, which occupies most of the time corresponding to the worker allocation step, is prepared in advance rather than being performed at the time at which a worker allocation request occurs, thus remarkably reducing the worker allocation time.

Figure 12:
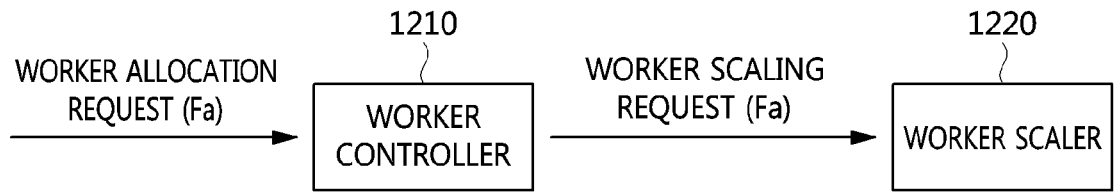
FIGS. 12 to 14 are diagrams illustrating examples of a ready worker upscaling procedure according to the present invention.
Figure 13:
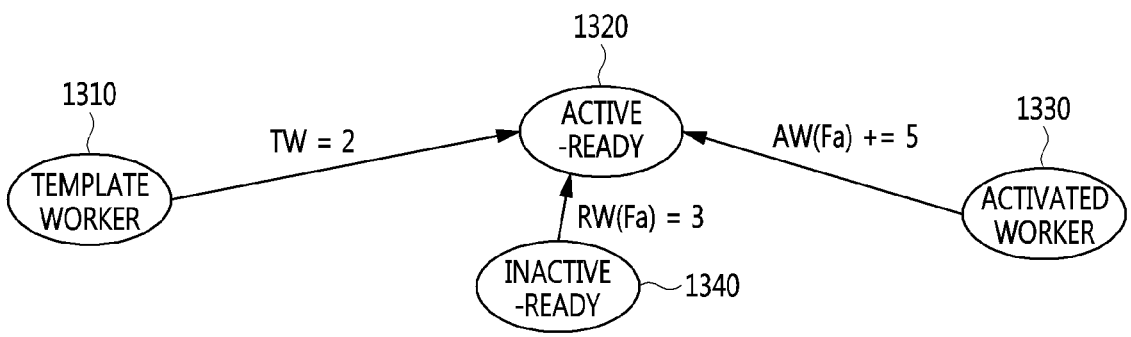
Figure 14:
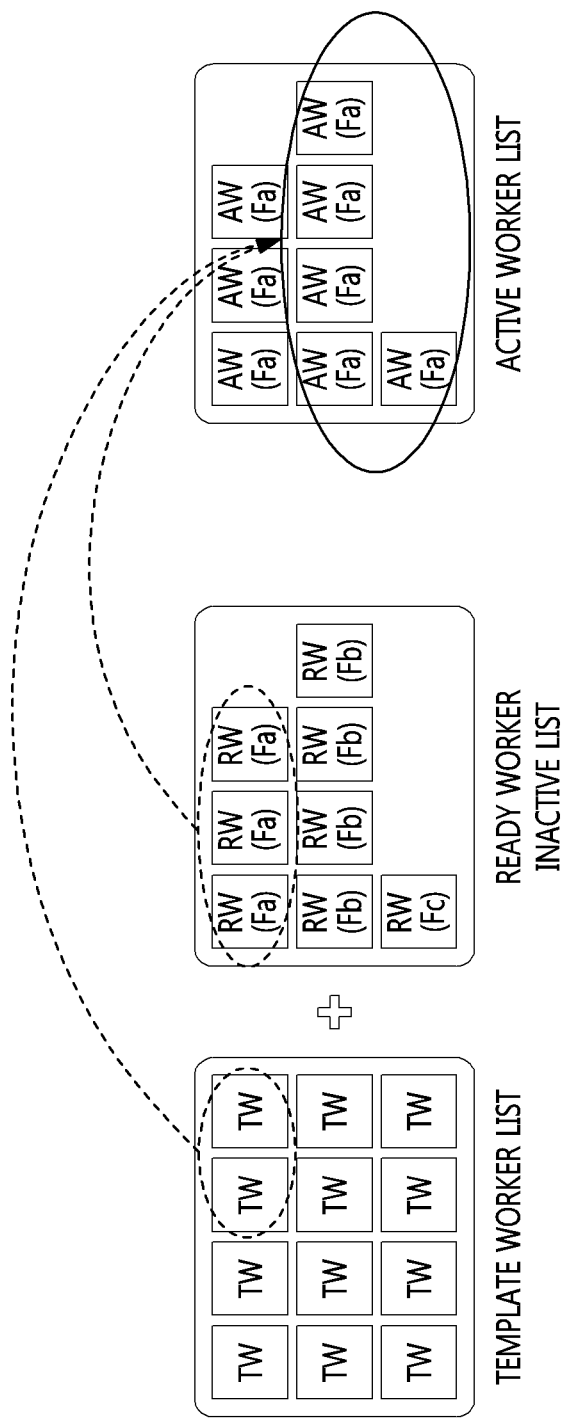

For example, referring to FIGS. 12 to 14, in a worker-scheduling apparatus according to an embodiment of the present invention, a worker control module (worker controller) 1210, which manages the processing of Representational State Transfer Application Programming Interface (REST API) requests from external components and the processing of requests from internal components, may request worker scaling from a worker-scaler module (worker scaler) 1220 in order to realize worker pre-allocation for improving a response speed to a worker allocation request Fa. Here, the worker scaler 1220 may predict the number of workers to be pre-allocated based on a worker allocation request period. Assuming that there are three ready workers 1340 in an inactive ready state, which are allocated to the function Fa in the state in which the predicted number of workers to be pre-allocated is five, active (activated) workers 1330 may be allocated to satisfy the number of workers to be pre-allocated by changing two template workers 1310 to ready workers 1320 in an active ready state, as illustrated in FIGS. 13 and 14.

That is, ready workers in an allocable state may be prepared first at minimal cost through active transition, in which ready workers in the inactive ready state are changed to ready workers in the active ready state. Thereafter, unless worker pre-allocation is satisfied through active transition, a ready worker upscaling procedure for changing template workers to ready workers may be performed.

Here, the number of workers to be pre-allocated may correspond to a value obtained by subtracting the number of ready workers in the active ready state and the number of workers in the active running state from the number of workers required during a unit time interval for each function.

For example, when a worker scheduling request occurs so as to manage workers required for function execution, a Scaling Index (SI) value, which is the number of workers required during a unit time interval $\Delta t$, may be calculated based on the average execution time Tx of workers and worker allocation request period Tf.

Here, the number of workers required during the unit time interval for each function may correspond to a value obtained by dividing the average execution time Tx of workers that execute the function by the worker allocation request period Tf for each function. For example, the average execution time Tx may be used as the average value of execution times recorded by a function (Fn) executor in the termination of the workers.

Here, the number of workers that require worker scaling (i.e., Incremental Count: IC) may refer to the number of workers to be pre-allocated, which are additionally required except for ready workers that are currently in a standby state and workers that are currently executing the function. Therefore, IC may correspond to a value obtained by subtracting the number of ready workers currently in an active ready state and the number of workers currently in an active running state from the value of SI, as given by the following Equation (1):

$$IC_t = (Tx_{t-1}/Tf_t) - (N_{rw} + N_{aw}) \quad (1)$$

Here, $(Tx_{t-1}/Tf_t)$ in Equation (1) may denote the number of workers $SI_t$ required during the unit time interval $\Delta t$, and $N_{rw}$ and $N_{aw}$ may denote the number of ready workers currently in the active ready state and the number of workers currently in the active running state, respectively.

Further, although not illustrated in FIG. 4, the worker-scheduling method in the cloud-computing system according to the embodiment of the present invention may perform ready worker upscaling which changes a template worker to a ready worker when an active worker usage ratio is greater than a preset active upper reference value.

Furthermore, although not illustrated in FIG. 4, the worker-scheduling method in the cloud-computing system according to the embodiment of the present invention may change the state of a ready worker in an active ready state to an inactive ready state when an active worker usage ratio is less than or equal to a preset active lower reference value.

Here, the active worker usage ratio may correspond to the ratio of the number of active workers to the sum of the numbers of ready workers in the active ready state and active workers. That is, the active worker usage ratio may also indicate the ratio of the number of workers in the active running state that are actually executing the function to the total number of workers in the active state (active ready+ active running) to which resources are currently allocated.

Figure 11:
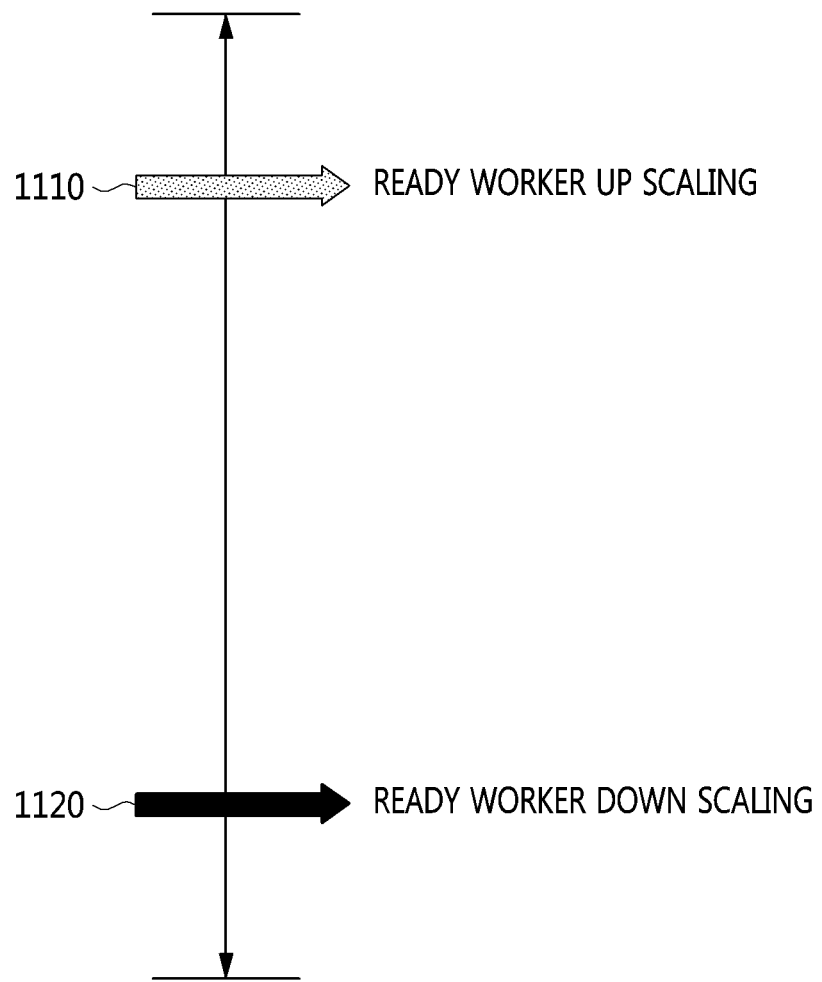
FIG. 11 is a diagram illustrating an example of a ready worker scheduling time point according to the present invention.

For example, referring to FIG. 11, it may be assumed that the ratio of the number of workers in the active running state, corresponding to the preset active upper reference value 1110, is 80% and that the ratio of the number of workers in the active running state, corresponding to the preset active lower reference value 1120, is 20%.

Here, when the measured active worker usage ratio is greater than the preset active upper reference value 1110, ready worker upscaling may be performed. That is, when the active worker usage ratio is greater than 80%, most workers have been allocated to function execution, and thus it may be determined that additional workers are required, and ready worker upscaling may be performed.

Also, when the measured active worker usage ratio is less than or equal to the preset active lower reference value 1120, inactive transition may be performed. Here, "inactive transition" may be a procedure for changing the state of the ready worker in the active ready state to an inactive ready state by releasing the resources allocated to the ready worker in the active ready state.

Further, although not illustrated in FIG. 4, the worker-scheduling method in the cloud-computing system according to the embodiment of the present invention may initialize, based on worker downscaling, the ready worker that is not used during a preset idle time to a template worker.

For example, assuming that the preset idle time is IdleTime, ready worker downscaling may be performed on a worker that is not used for function execution during the IdleTime, among ready workers in an inactive state which are allocated to the function, and thus the corresponding worker may be changed to a template worker.

Further, although not illustrated in FIG. 4, the worker-scheduling method in the cloud-computing system according to the embodiment of the present invention may perform ready worker downscaling, which changes a ready worker in an inactive ready state to a template worker when an inactive worker ratio is greater than a preset inactive upper reference value.

Here, the inactive worker ratio may be the ratio of the number of ready workers in an inactive ready state, in which resource allocation is released after function execution has been completed, to the number of ready workers allocated to the function. For example, assuming that the preset inactive upper reference value is 80%, when the inactive worker ratio is greater than 80%, it may be determined that the current step is the step at which the execution of the function at the allocated worker is reduced, and thus ready worker downscaling, which changes the ready worker that is not used to a template worker, may be performed.

Here, although not illustrated in FIG. 4, the worker-scheduling method in the cloud-computing system according to the embodiment of the present invention may store various types of information generated in the above-described worker-scheduling process in a separate storage module.

By utilizing this worker-scheduling method, container-based workers that perform a function service may be rapidly allocated, and response costs may be minimized.

Further, the worker-scheduling method may actively respond to variation in a function service request load, may minimize an allocation latency in a short-term function service requiring a short response time, and may suitably distribute execution preparation loads of workers related to the execution of a function in advance, thus making a FaaS platform more suitable for a real-time processing environment.

Furthermore, by applying this worker-scheduling method to a medical AI diagnostic/learning cloud platform based on cloud infrastructure shared by multiple medical institutions, scheduling that can efficiently support a primary task, such as a diagnostic service, may be realized.

Figure 15:
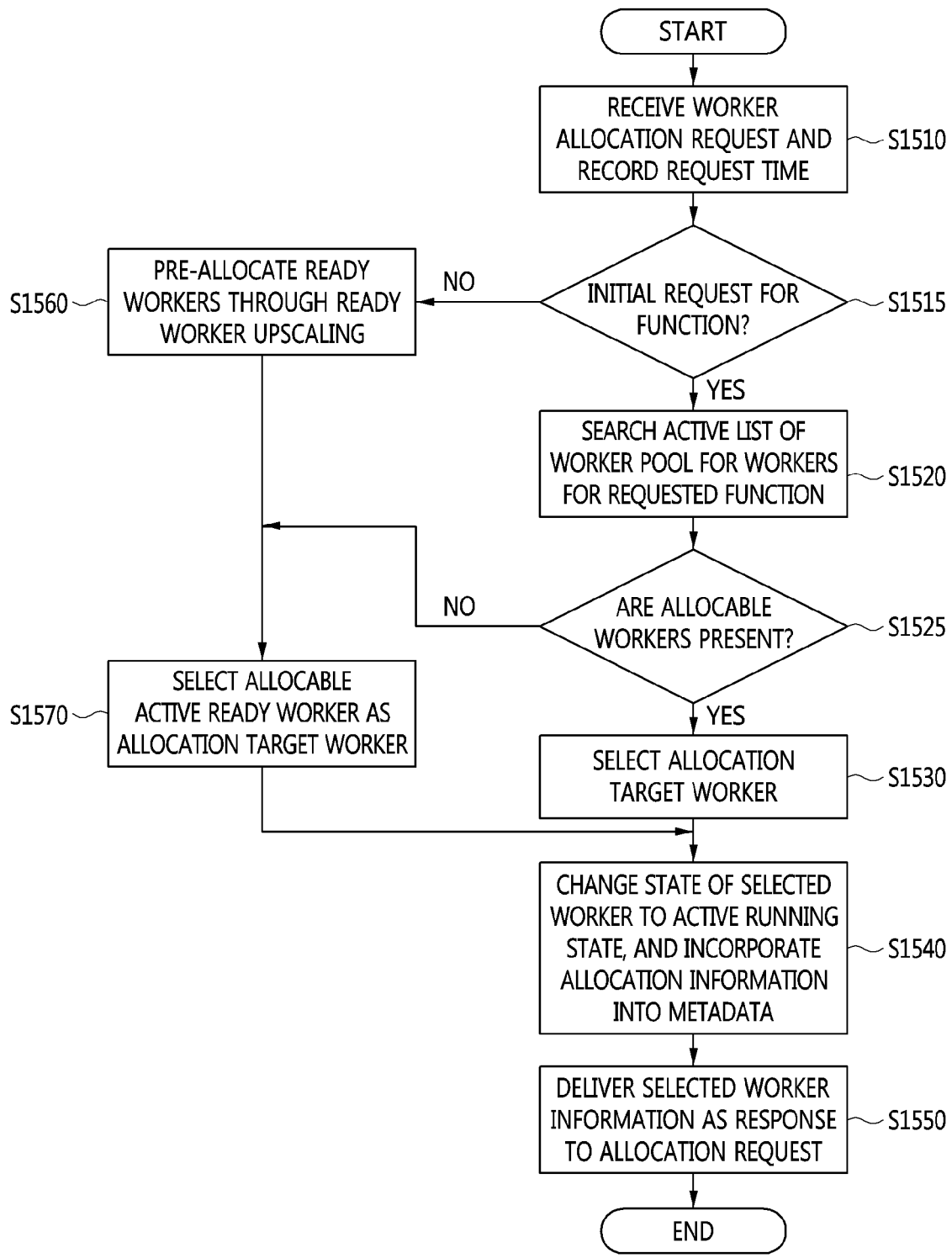
FIG. 15 is an operation flowchart illustrating in detail a worker-scheduling method according to an embodiment of the present invention.

FIG. 15 is an operation flowchart illustrating in detail a worker-scheduling method according to an embodiment of the present invention.

Referring to FIG. 15, in the worker-scheduling method according to an embodiment of the present invention, a worker-scheduling apparatus may record request time information about the time at which worker allocation is requested when a worker allocation request for function execution is received at step S1510.

Here, the request time information may be used to predict and calculate the number of workers to be pre-allocated, together with the execution time information of the corresponding function.

Thereafter, the worker-scheduling apparatus may determine whether the corresponding worker allocation request is an initial worker allocation request for the function at step S1515.

As a result of the determination at step S1515, if the corresponding worker allocation request is not an initial worker allocation request for the function, a requested number of active ready workers are searched for in an active ready list managed by a worker pool at step S1520, and whether allocable ready workers are present may be determined at step S1525.

If it is determined at step S1525 that there are as many allocable ready workers as the worker allocation request, a ready worker in the active ready list of the worker pool may be selected as an allocation target at step S1530.

Next, the state of the selected ready worker may be changed to an active running state, and information about allocation may be incorporated into metadata at step S1540.

Thereafter, information about the selected worker may be delivered as a response to the allocation request at step S1550.

Further, as a result of the determination at step S1515 that the corresponding worker allocation request is an initial allocation request for the function, a ready worker in an active ready state is pre-allocated through ready worker upscaling at step S1560, and lists generated in the worker pool may be periodically searched, and thus an allocable ready worker in an active ready state may be selected as an allocation target worker at step S1570.

Here, the case where the worker allocation request is an initial allocation request for the function may mean that an allocable ready worker in an active ready state is not yet present in the worker pool. Therefore, when the initial allocation request for the function occurs, pre-allocation for launching as many template workers as a basic allocation number as ready workers in an active ready state may be performed through ready worker upscaling based on a background task.

Figure 16:
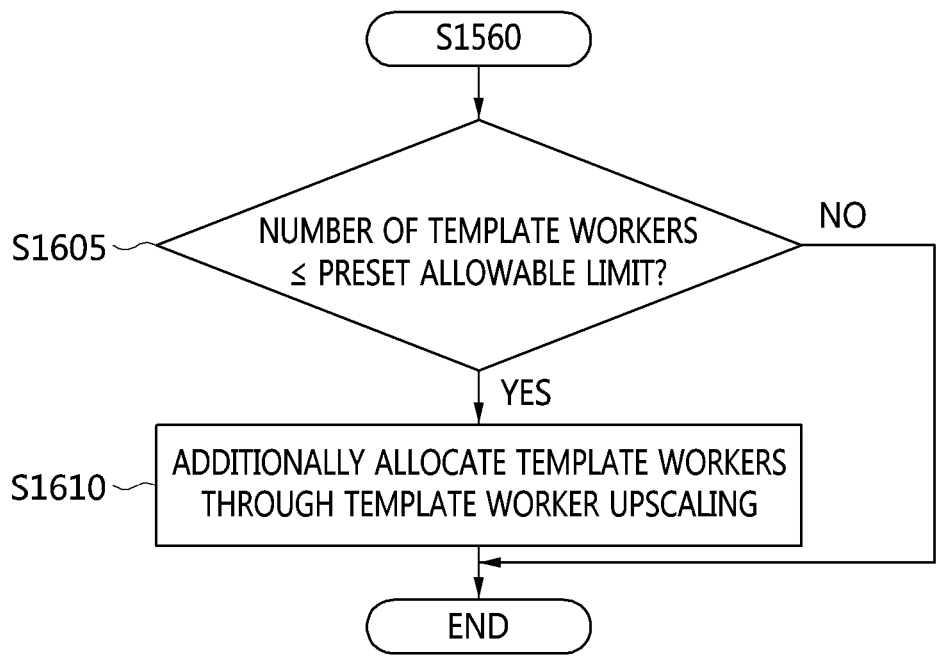
FIG. 16 is an operation flowchart illustrating in detail a template worker upscaling procedure according to an embodiment of the present invention.

Here, in the present invention, when the ready workers in the active ready state are pre-allocated through ready worker upscaling, as in the case of step S1560, whether the number of template workers becomes less than or equal to a preset allowable limit may be checked, as illustrated in FIG. 16, at step S1605.

If it is determined at step S1605 that the number of template workers managed by the worker pool is less than or equal to the preset allowable limit, template workers may be additionally created and allocated through template worker scaling at step S1610.

For example, a number of template workers corresponding to 20% of the maximum number of creatable workers may be additionally created and allocated, and the template worker scaling may be performed based on a background task.

By means of the process of FIG. 16, the system may perform the procedure for creating and initializing of workers, which requires the longest processing time at the worker allocation step, before a worker allocation request occurs.

Here, if it is determined at step S1605 that the number of template workers managed by the worker pool is not equal to or less than the preset allowable limit, the process may be terminated without performing an additional task.

In addition, if it is determined at step S1525 that as many allocable ready workers as the worker allocation request are not present, a ready worker in an active ready state may be additionally pre-allocated through ready worker upscaling at step S1560. Then, an allocable ready worker in an active ready state may be selected as an allocation target worker by periodically searching the lists generated in the worker pool at step S1570. Thereafter, the worker allocation task may be completed by performing the process ranging from step S1540 to step S1550.

Figure 17:
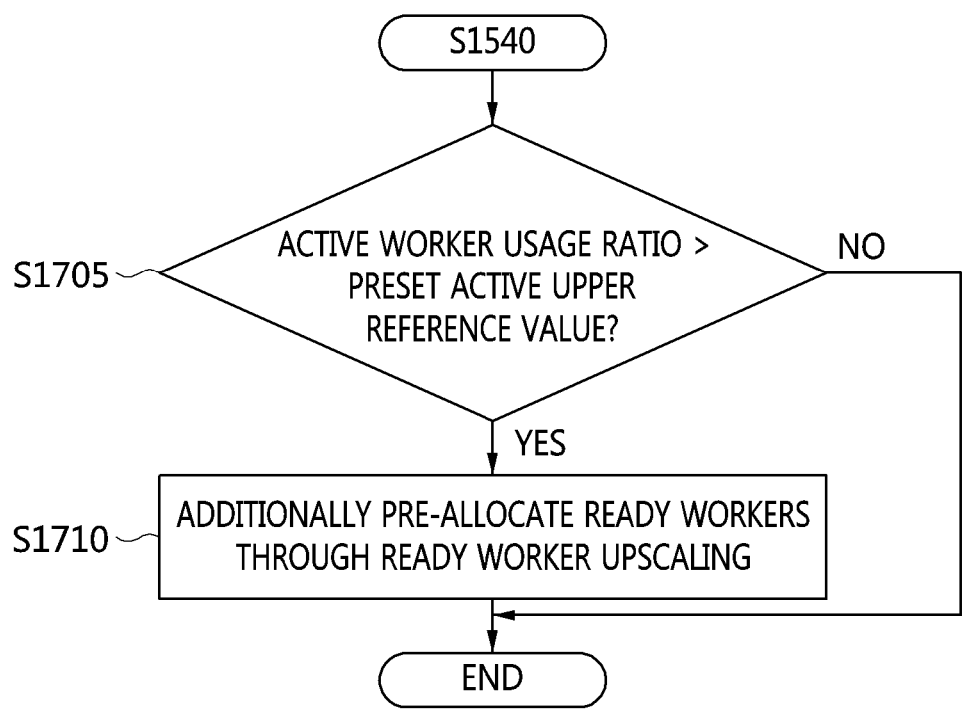
FIG. 17 is an operation flowchart illustrating a procedure for performing ready worker upscaling depending on an active worker usage ratio according to an embodiment of the present invention.

Further, in the present invention, when the number of active workers in the active running state increases due to the worker allocation at step S1540, whether an active worker usage ratio is greater than a preset active upper reference value may be checked at step S1705, as illustrated in FIG. 17.

If it is determined at step S1705 that the active worker usage ratio is greater than the preset active upper reference value, ready workers may be additionally pre-allocated through ready worker upscaling at step S1710.

The ready workers may be additionally pre-allocated through the process of FIG. 17, so that, when a worker allocation request is received, a ready worker may be immediately allocated.

Figure 18:
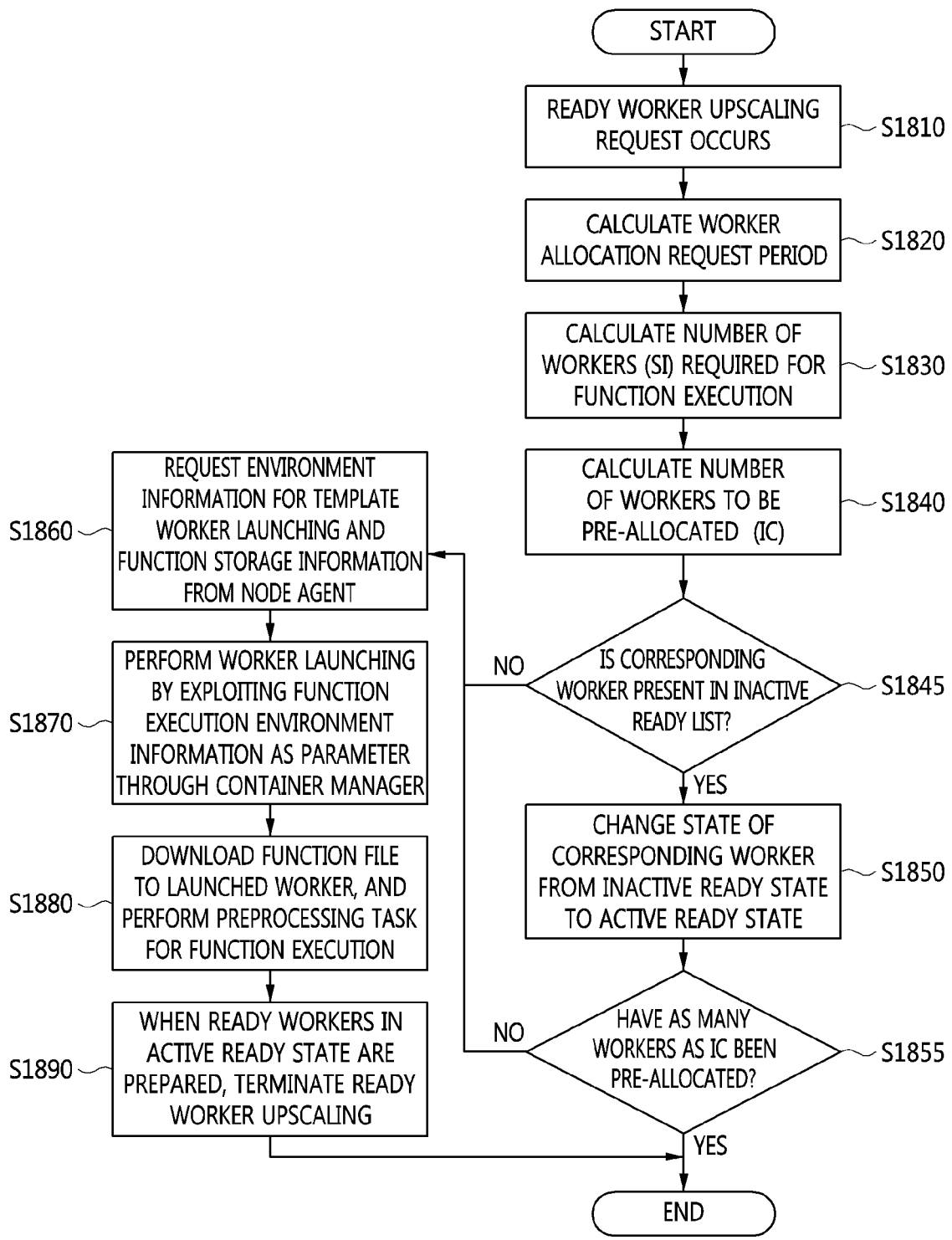
FIG. 18 is an operation flowchart illustrating in detail a ready worker upscaling procedure according to an embodiment of the present invention.

FIG. 18 is an operation flowchart illustrating in detail a ready worker upscaling procedure according to an embodiment of the present invention.

Referring to FIG. 18, in the ready worker upscaling procedure according to the embodiment of the present invention, when initial worker allocation for executing a function is performed, or when an active worker usage ratio is greater than a preset upper reference value and then a ready worker upscaling request occurs at step S1810, a worker allocation request period Tf may be calculated in order to obtain the number of workers to be pre-allocated (i.e., Incremental Count: IC), which requires ready worker upscaling, at step S1820.

Here, the worker allocation request period Tf may be calculated based on the number of worker allocation requests recorded during a unit time interval Δt, which is based on the current time, that is, the number of function requests.

Next, the number of workers (Scaling Index: SI) required for a function service can be calculated by dividing the average execution time Tx of workers that execute the function by the worker allocation request period Tf at step S1830.

Here, the average execution time Tx may correspond to the average value of execution times recorded as the workers are terminated.

Thereafter, the number of workers to be pre-allocated (IC) may be calculated by subtracting the number of workers in an active state, which are currently allocated to the corresponding function, from the number of workers required for function execution (SI) at step S1840.

Here, the workers in the active state may indicate a ready worker in an active ready state and an active worker in an active running state.

Thereafter, whether an allocable worker is present in an active ready list in the worker pool may be determined at step S1845.

Here, since ready workers in the inactive ready list are workers from which only resource allocation is released after the execution of the function has been terminated, they may be immediately used as ready workers in an active ready state, as long as the allocation of resources is realized. Therefore, in the present invention, an allocable worker may be prepared at minimal cost through active transition, which changes each ready worker in an inactive ready state to a ready worker in an active ready state.

If it is determined at step S1845 that an allowable worker is present in the inactive ready list, the state of the corresponding worker makes a transition to the active ready state through active transition at step S1850. Then, whether as many workers as the number of workers to be pre-allocated (IC) have been pre-allocated is determined at step S1855.

If it is determined at step S1855 that as many workers as the number of workers to be pre-allocated (IC) have been pre-allocated, ready worker upscaling may be terminated.

That is, when as many workers as the number of workers to be pre-allocated (IC) have been completely allocated through active transition, ready worker upscaling may be terminated.

However, if it is determined at step S1845 that an allocable worker is not present in the inactive ready list, or if it is determined at step S1855 that as many workers as the number of workers to be pre-allocated (IC) have not been pre-allocated, a ready worker upscaling procedure may be performed by launching a template worker and changing the template worker to a ready worker at step S1860 or step S1890.

First, the worker-scheduling apparatus according to the embodiment of the present invention may request environment information for function execution and function storage information from a node agent provided in the computing node at step S1860.

Thereafter, the template worker may be launched by exploiting the function execution environment information as a parameter through a container manager, and thus the template worker may be changed to a ready worker at step S1870.

At this time, the node agent may perform a task for launching the template worker by exploiting the function execution environment information as the parameter based on a container manager or a lightweight virtual instance manager.

Thereafter, a function file is downloaded to the depository of the launched template worker, and a preprocessing task for function execution is performed, and thus the preparation of the ready worker may be completed at step S1880.

Next, when as many ready workers in an active ready state as the number of workers to be pre-allocated (IC) are prepared by changing the state of the prepared ready worker to an active ready state and incorporating the allocation information of the corresponding ready workers, ready worker upscaling may be terminated at step S1890.

Figure 19:
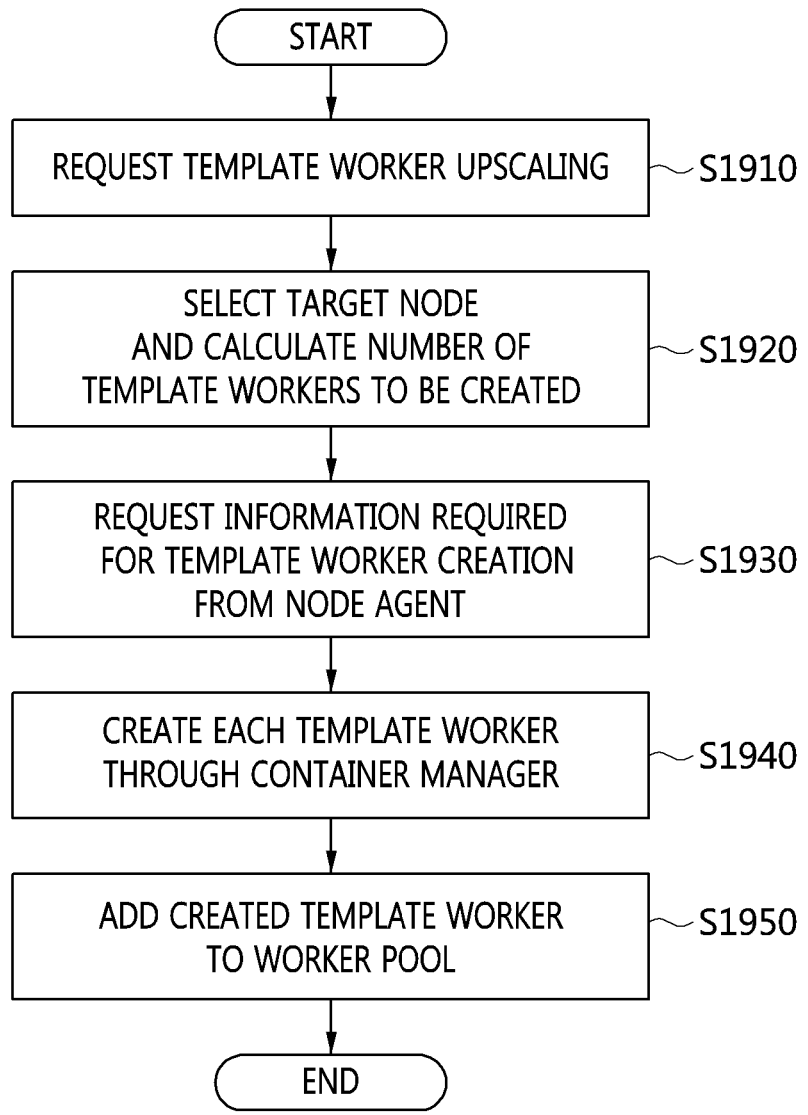
FIG. 19 is an operation flowchart illustrating in detail a template worker upscaling procedure according to an embodiment of the present invention.

FIG. 19 is an operation flowchart illustrating in detail a template worker upscaling procedure according to an embodiment of the present invention.

Referring to FIG. 19, in the template worker upscaling procedure according to the embodiment of the present invention, when a computing node is initially registered or when the number of available template workers of the system is less than or equal to a preset allowable limit through ready worker upscaling, template worker upscaling may be requested by the worker-scheduling apparatus in the background at step S1910.

Next, the worker-scheduling apparatus may select a target node requiring template worker upscaling and calculate the number of template workers to be created in the target node at step S1920.

For example, the number of created template workers may be calculated to correspond to 20% of the number of workers creatable in the target node.

Thereafter, when the worker-scheduling apparatus requests information required for template worker creation from the node agent of the target node by exploiting the number of created template workers as a parameter at step S1930, the node agent may create a container, which is an instance of each template worker, through a container manager or a lightweight virtual instance manager at step S1940.

Then, the worker-scheduling apparatus may change the state of each created template worker to 'Qualified' and add the created temperate worker to the template worker list of the worker pool at step S1950, and may incorporate creation information of the corresponding worker.

Thereafter, although not illustrated in FIG. 19, whether creation of template workers in all computing nodes has been completed is determined, after which the procedure ranging from steps S1910 to S1950 may be repeatedly performed for each node when any computing node in which a template worker is to be created is present. Thereafter, when the creation of template workers for all computing nodes is completed, template worker upscaling may be terminated.

Figure 20:
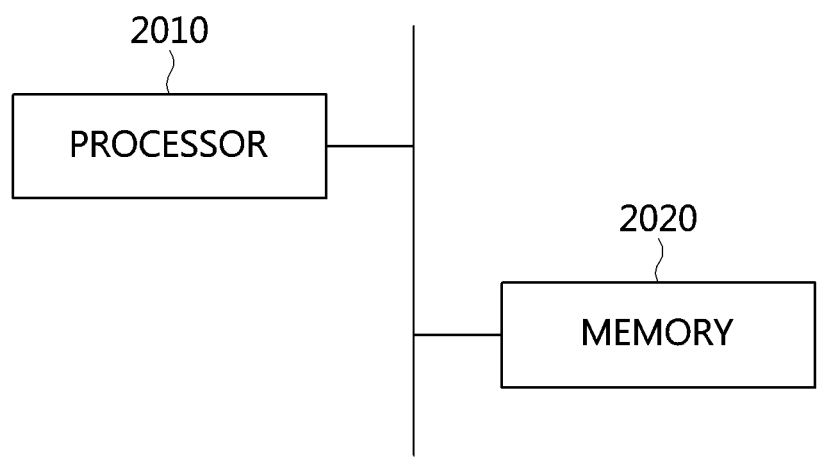
FIG. 20 is a block diagram illustrating a worker-scheduling apparatus in a cloud-computing system according to an embodiment of the present invention.

FIG. 20 is a block diagram illustrating a worker-scheduling apparatus in a cloud-computing system according to an embodiment of the present invention.

Referring to FIG. 20, the worker-scheduling apparatus in the cloud-computing system according to the embodiment of the present invention includes a processor 2010 and memory 2020.

The processor 2010 pre-creates template workers so as to process worker execution preparation loads in a distributed manner before a worker allocation request for executing a function occurs.

Here, the present invention is intended to propose a three-step worker instance-based worker-scheduling algorithm through two-step worker pre-allocation in order to solve the problem of two-step worker instance-based worker scheduling in which a response execution time is lengthened depending on initial worker allocation and load variation.

First, each worker may be a high-level logical resource, which corresponds to a container object of a computing node for executing a micro-function, and may be allocated computing resources of an actual physical node at an allocation step for function execution. Here, each worker according to an embodiment of the present invention may correspond to a basic unit for scheduler allocation and scaling, and may be classified into three steps, as illustrated in FIG. 5.

Referring to FIGS. 5 and 6, a template worker 510 may be a temporary worker in a middle step, which is configured in accordance with a base-runtime image and minimal resource capacity so that the template worker can be used in common in all functions. In the present invention, the template worker may be utilized for pre-creation which supports fast worker allocation processing and load variation processing through the distribution of worker allocation and initialization times, as illustrated in FIG. 6.

A procedure for creating the template worker 510 may correspond to a worker creation procedure which requires a lot of execution time in two-step worker instance-based worker scheduling, but may be performed when worker scheduling initially begins or when the number of template workers decreases below a predetermined ratio, rather than being performed when a worker allocation request occurs. That is, in the present invention, a worker creation procedure, which occupies an execution time of 70 to 80% of the worker allocation and initialization procedure, may be implemented at the template worker creation step.

Here, when the number of template workers is less than or equal to a preset allowable limit to the maximum number of creatable workers, a template worker may be additionally created by performing template worker upscaling in the background.

For example, template worker upscaling may be performed such that a number of template workers corresponding to about 20% of the maximum number of workers creatable by all computing nodes of the system are gradually created. At this time, since template worker upscaling is performed in the background and such a template worker is a temporary worker that is pre-created regardless of workers that are executing functions, the template worker can be efficiently operated so that the execution of functions is not delayed, or so that a load is not imposed.

Therefore, when a normal worker allocation request is received, only a procedure for changing a pre-created template worker to a ready worker needs to be performed through the setting of resource information and the loading of a function, and thus a response to the worker allocation request may be made only at an execution cost of about 15 to 20% of the existing cost.

Also, the processor 2010 predicts the number of workers to be pre-allocated in consideration of variation in a worker allocation request period for each function.

Here, the present invention relates to worker-scheduling technology that actively responds to a function service request load, and may determine whether to perform worker scaling for managing workers that will execute the function through variation in a worker allocation request period, rather than a worker allocation request.

For example, when the worker allocation request period becomes shorter than the function execution time, the number of workers may be dynamically increased in a ready state, in which the function can be executed through worker scaling. For this operation, the number of workers required for scaling, that is, the number of workers to be pre-allocated, may be calculated using the function execution time and a function service request period, and the time point at which worker scaling is needed may be determined by means of the ratio of the number of workers that are actually executing the function to the number of allocation-ready workers.

By means of the worker scheduling based on such an apparatus, workers for executing functions are prepared in advance, and thus the response time to a worker allocation request may be improved.

In this case, the worker allocation request period for each function may be calculated based on the number of workers required to be allocated during a unit time for each function.

For example, referring to FIG. 10, a worker allocation request period Tf for each function may be calculated based on a dynamic sliding window (i.e., a Dynamic flexible Sliding Window: DSW). Here, a dynamic sliding window 1020 illustrated in FIG. 10 may denote a unit time interval Δt indicating a unit time for each function, and the worker allocation request period for each function may be calculated using the number of worker allocation requests 1010 within the unit time interval Δt.

Here, the unit time interval Δt may be dynamically and flexibly varied for each function. That is, when there are many worker allocation requests 1010, the unit time interval Δt through the dynamic sliding window may be reduced to half. Further, when there are no worker allocation requests 1010 during the unit time interval Δt, the corresponding interval may be gradually increased twice. Here, the maximum value of the unit time interval Δt may correspond to the timeout value of a short-term execution function.

Further, the processor 2010 pre-allocates ready workers by performing worker upscaling on as many template workers as the number of workers to be pre-allocated.

Referring to FIGS. 5 and 6, each ready worker 520 may be a worker in a function-execution-ready state, for which the setting of resource information for function execution and the allocation of resources have been completed. That is, the ready worker may be a worker at the step at which the worker is allocated to the function, and may be a worker at an execution-ready step in which the function to be actually executed is loaded.

Further, an active worker 530 illustrated in FIG. 5 may be a worker that actually executes the function after having been allocated by the scheduler, and may also mean a worker in which the ready worker 520 is in an active running state (or an active run state), which will be described later.

Here, the workers of the present invention illustrated in FIG. 5 may constitute separate lists for respective worker instance types, and all of the lists may be managed as a single worker pool, as illustrated in FIG. 7.

Referring to FIG. 7, the worker pool according to an embodiment of the present invention may be generated when the worker scheduler or a worker-scheduling apparatus is activated, and in the beginning, only a template worker list 710 may be present.

Here, the configuration of nodes and information about resources may be registered in response to a node registration request received from a node agent provided in each computing node. Also, the number of template workers that can be created in the computing node may be set depending on memory capacity, among pieces of resource information of the nodes, and in the beginning, a number of template workers corresponding to about 30% of the total number of workers that can be created in the node may be created and added to the worker pool.

Furthermore, the processor 2010 may allocate a ready worker as an active worker in response to the worker allocation request for function execution, and may change the state of a deallocated ready worker in consideration of a function service request load.

For example, referring to FIG. 7, template workers TWK included in a template worker list 710 may be changed to ready workers in response to a worker allocation request.

Here, the state of each ready worker may be any one of an active ready state, in which the allocation of resources and loading of a function file have been completed, and an inactive ready state, in which resources are not allocated, but the loading of a function file has been completed.

That is, the active ready state may indicate a worker instance in a standby state in which a worker is not allocated, but a ready state must be maintained in consideration of the condition of a function service request load. Further, the inactive ready state may indicate the state of a worker instance in which a deallocated ready worker is to be maintained until the deallocated ready worker is completely unnecessary.

For example, execution time costs required in order to change from a template worker to a ready worker may be considered to be lower than the cost required for creation of the template worker, but an execution time of 10 to 15% is still required. However, variation between the active state and the inactive state of the ready worker merely corresponds to a task for changing an active ready list 730, an inactive ready list 720, and a state flag illustrated in FIG. 7, and thus hardly any execution time is required.

That is, in order to minimize the situation in which the template worker changes to the ready worker when a worker allocation request for the function is received, the present invention may apply a lazy deallocation scheme in which a worker, created as a ready worker, is maintained even in the situation in which the worker is not used, thus minimizing worker allocation cost.

Here, the present invention may change and manage worker instances so that execution costs incurred by the actual worker allocation request are minimized by performing anticipative worker allocation and deallocation through worker scaling, which depends on the present usage state of supported system resources, a present worker available state, and variation in a worker allocation request load.

Here, the worker scheduling according to an embodiment of the present invention may mean a processing procedure for creating, changing or destroying a plurality of workers when a specific condition or situation is satisfied.

For example, referring to FIG. 8, worker scheduling according to an embodiment of the present invention may be classified into template worker scaling, which creates or destroys a plurality of template workers, ready worker upscaling, which changes a plurality of template workers to ready workers, and ready worker downscaling, which changes ready workers back to template workers.

Here, template worker scaling may be a procedure for processing pre-allocation (upscaling) or deallocation (downscaling) of template workers in order to cancel the total worker creation cost, corresponding to 70 to 80% of the total worker allocation cost in template worker scaling. Here, each template worker may indicate a worker to which an image and minimum resources that can be used in common by all workers are allocated. When the template worker availability of the system is decreased below a threshold, a template worker may be pre-allocated via template worker scaling. At this time, a number of initial template workers corresponding to about 20% of the total number of workers creatable in the entire system may be created at after a worker pool has been created. For example, template worker scaling may be performed in such a way as to add or delete a template worker from the corresponding template worker list managed by the worker pool by creating or destroying template workers in the computing node.

Here, ready worker upscaling may be a procedure for increasing the number of ready workers to anticipatively respond to a function service request. Here, ready worker upscaling may be performed based on a function allocation request period so as to guarantee a fast response speed and a short execution time in response to the worker allocation request. For example, a task for changing a template worker to a ready worker that is capable of executing a function and for adding the ready worker to a ready worker list may be performed.

Here, ready worker downscaling may correspond to a procedure for initializing ready workers in an inactive ready state, which are allocated to a specific function and are not used for a long period of time, and then changing the ready workers to template workers that are usable in response to another function allocation request. For example, function resource setting and loading information of the ready workers in the inactive ready state may be initialized, so that the ready workers may be changed to template workers, and the changed template workers may be added to the template worker list.

Here, the processor according to the embodiment of the present invention may manage the states of various workers, as illustrated in FIG. 9, in the worker scaling and worker allocation and deallocation procedures, and may change the states of workers in response to a request depending on function execution or variation in conditions.

For example, referring to FIG. 9, among five states of workers, an empty state may literally mean the state in which there is no worker.

Also, a qualified state illustrated in FIG. 9, which indicates the state in which a worker is created as a base-runtime image, may indicate a template worker or the state in which resource allocation is not performed, but only a physical container is created in the corresponding node. The template worker in this state may be created through template worker scaling, or may be created by changing the ready worker in an inactive ready state to a template worker through ready worker downscaling.

Also, an inactive ready state illustrated in FIG. 9 may correspond to the state that the ready worker, which has been allocated to and used by a function, can have, and may indicate the state in which resource allocation is not performed but a function is loaded.

That is, a significant portion of worker allocation cost may be proactively processed through template worker scaling, but execution cost corresponding to 15 to 20% of the worker allocation cost is incurred even during the procedure for changing between a template worker and a ready worker. As a result, the problem related to the delay of a response time to worker allocation may still remain unsolved. However, during the procedure for changing a ready worker in an inactive ready state to an active ready state, separate costs are not incurred. Thus, a fast response to a worker allocation request may be returned by maintaining the ready worker, which is not currently used, in an inactive state without immediately changing the ready worker to a template worker.

Also, the active ready state may indicate the state in which the allocation of resources and the loading of a function file are completed and the execution of a function is available. At this time, a template worker may be changed to a ready worker through ready worker upscaling, or alternatively, a ready worker in an active ready state may be created by changing the state of the ready worker in the inactive ready state.

Further, an active running state may indicate the state in which the worker is actually executing a function, and in which the ready worker in the active ready state may be changed to the active running state in response to a worker allocation request.

In this way, worker creation and initialization at the worker allocation step may be separated and processed as separate tasks, thus reducing a response time delay overhead in the worker allocation task. That is, a worker creation procedure, which occupies most of the time corresponding to the worker allocation step, is prepared in advance rather than being performed at the time at which a worker allocation request occurs, thus remarkably reducing the worker allocation time.

For example, referring to FIGS. 12 to 14, in a worker-scheduling apparatus according to an embodiment of the present invention, a worker control module (worker controller) 1210, which manages the processing of Representational State Transfer Application Programming Interface (REST API) requests from external components and the processing of requests from internal components, may request worker scaling from a worker-scaler module (worker scaler) 1220 in order to realize worker pre-allocation for improving a response speed to a worker allocation request Fa. Here, the worker scaler 1220 may predict the number of workers to be pre-allocated based on a worker allocation request period. Assuming that there are three ready workers 1340 in an inactive ready state, which are allocated to the function Fa in the state in which the predicted number of workers to be pre-allocated is five, active workers 1330 may be allocated to satisfy the number of workers to be pre-allocated by changing two template workers 1310 to ready workers 1320 in an active ready state, as illustrated in FIGS. 13 and 14.

That is, ready workers in an allocable state may be prepared first at minimal cost through active transition, in which ready workers in the inactive ready state are changed to ready workers in the active ready state. Thereafter, unless worker pre-allocation is satisfied through active transition, a ready worker upscaling procedure for changing template workers to ready workers may be performed.

Here, the number of workers to be pre-allocated may correspond to a value obtained by subtracting the number of ready workers in the active ready state and the number of workers in the active running state from the number of workers required during a unit time interval for each function.

For example, when a worker scheduling request occurs so as to manage workers required for function execution, a Scaling Index (SI) value, which is the number of workers required during a unit time interval $\Delta t$, may be calculated based on the average execution time Tx of workers and worker allocation request period Tf.

Here, the number of workers required during the unit time interval for each function may correspond to a value obtained by dividing the average execution time Tx of workers that execute the function by the worker allocation request period Tf for each function. For example, the average execution time Tx may be used as the average value of execution times recorded by a function (Fn) executor in the termination of the workers.

Here, the number of workers that require worker scaling (i.e., Incremental Count: IC) may refer to the number of workers to be pre-allocated, which are additionally required except for ready workers that are currently in a standby state and workers that are currently executing the function. Therefore, IC may correspond to a value obtained by subtracting the number of ready workers currently in an active ready state and the number of workers currently in an active running state from the value of SI, as given by the following Equation (1):

$$IC_t = (Tx_{t-1}/Tf_t) - (N_{rw} + N_{aw}) \qquad (1)$$

Here, $(Tx_{t-1}/Tf_t)$ in Equation (1) may denote the number of workers $SI_t$ required during the unit time interval $\Delta t$, and $N_{rw}$ and $N_{aw}$ may denote the number of ready workers currently in the active ready state and the number of workers currently in the active running state, respectively.

Further, the processor 2010 may perform ready worker upscaling which changes a template worker to a ready worker when an active worker usage ratio is greater than a preset active upper reference value.

Furthermore, the processor 2010 may change the state of a ready worker in an active ready state to an inactive ready state when an active worker usage ratio is less than or equal to a preset active lower reference value.

Here, the active worker usage ratio may correspond to the ratio of the number of active workers to the sum of the numbers of ready workers in the active ready state and active workers. That is, the active worker usage ratio may also indicate the ratio of the number of workers in the active running state that are actually executing the function to the total number of workers in the active state (active ready+ active running) to which resources are currently allocated.

For example, referring to FIG. 11, it may be assumed that the ratio of the number of workers in the active running state, corresponding to the preset active upper reference value 1110, is 80% and that the ratio of the number of workers in the active running state, corresponding to the preset active lower reference value 1120, is 20%.

Here, when the measured active worker usage ratio is greater than the preset active upper reference value 1110, ready worker upscaling may be performed. That is, when the active worker usage ratio is greater than 80%, most workers have been allocated to function execution, and thus it may be determined that additional workers are required, and ready worker upscaling may be performed.

Also, when the measured active worker usage ratio is less than or equal to the preset active lower reference value 1120, inactive transition may be performed. Here, "inactive transition" may be a procedure for changing the state of the ready worker in the active ready state to an inactive ready state by releasing the resources allocated to the ready worker in the active ready state.

Further, the processor 2010 may initialize, based on worker downscaling, the ready worker that is not used during a preset idle time to a template worker.

For example, assuming that the preset idle time is IdleTime, ready worker downscaling may be performed on a worker that is not used for function execution during the IdleTime, among ready workers in an inactive state which are allocated to the function, and thus the corresponding worker may be changed to a template worker.

Furthermore, the processor 2010 may perform ready worker downscaling, which changes a ready worker in an inactive ready state to a template worker when an inactive worker ratio is greater than a preset inactive upper reference value.

Here, the inactive worker ratio may be the ratio of the number of ready workers in an inactive ready state, in which resource allocation is released after function execution has been completed, to the number of ready workers allocated to the function. For example, assuming that the preset inactive upper reference value is 80%, when the inactive worker ratio is greater than 80%, it may be determined that the current step is the step at which the execution of the function at the allocated worker is reduced, and thus ready worker downscaling, which changes the ready worker that is not used to a template worker, may be performed.

The memory 2020 stores a worker pool which manages workers for function execution.

Also, as described above, the memory 2020 may support functions for worker scheduling according to an embodiment of the present invention. Here, the memory 2020 may function as a separate large-capacity (mass) storage, and may include a control function for performing operations.

Meanwhile, the worker-scheduling apparatus may be equipped with memory, and may internally store information in the apparatus. In an embodiment, the memory may be a computer-readable storage medium. In an embodiment, the memory may be a volatile memory unit, and in another embodiment, the memory may be a nonvolatile memory unit. In an embodiment, a storage device may be a computerreadable storage medium. In various different embodiments, the storage device may include, for example, a hard disk device, an optical disk device or any other mass storage device.

By utilizing this worker-scheduling apparatus, container-based workers that perform a function service may be rapidly allocated, and response costs may be minimized.

Further, the worker-scheduling apparatus may actively respond to variation in a function service request load, may minimize an allocation latency in a short-term function service requiring a short response time, and may suitably distribute execution preparation loads of workers related to the execution of a function in advance, thus making a FaaS platform more suitable for a real-time processing environment.

Figure 21:
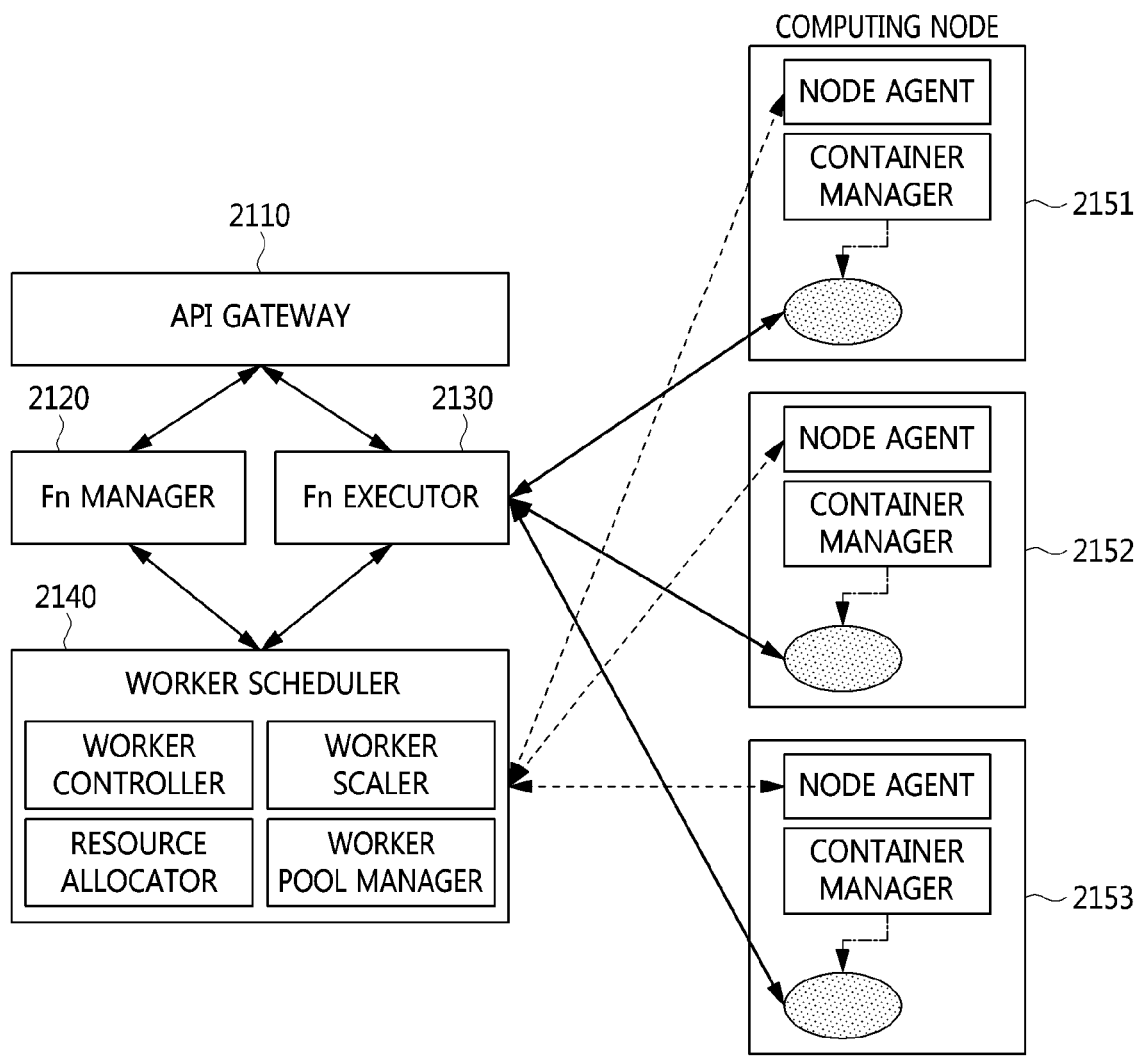
FIG. 21 is a block diagram illustrating in detail examples of internal components of a micro-function service platform and a worker scheduler according to the present invention.

FIG. 21 is a block diagram illustrating in detail examples of internal components of a micro-function service platform and a worker scheduler according to the present invention.

Referring to FIG. 21, a worker scheduler (i.e., a worker-scheduling apparatus) 2140 according to an embodiment of the present invention may autonomously manage resources registered by node agent components provided in nodes or computing nodes 2151 to 2153 without the aid of the node agent components, and may then allocate workers required for function execution.

Here, the worker scheduler 2140 may be operated by utilizing a worker control module (i.e., worker controller), which manages processing of REST API requests from external components and processing of requests from internal components, as a main module.

Also, the worker scheduler 2140 may register resources used for function execution in a resource allocation module (i.e., a resource allocator) based on node agent components during an initial stage of execution, and may autonomously deduct resources before worker allocation, or may again increase resources after worker deallocation.

Further, the worker scheduler 2140 may pre-allocate and manage workers so as to improve the speed of a response to a worker allocation request received from an API gateway 2110.

For example, the worker scheduler 2140 may pre-allocate a requested number of workers or more workers through a worker scaler module (i.e., a worker scaler) so as to reduce the activation load of the workers. For this operation, a worker pool manager module (i.e., a worker pool manager) may request the node agent component to activate and deactivate pre-allocated multiple workers.

In this way, the pre-allocated workers may be managed by the worker pool manager as a separate list for each instance type.

Here, the worker scaler may function to automatically scale up or scale down workers managed by the worker pool manager depending on a function request load. At this time, the worker scaler may perform worker scaling, which dynamically adjusts the states and the number of workers managed by the worker pool manager in response to the function execution request load.

Here, pre-allocation of workers, performed by the worker scaler, may be performed at two steps. First, first-step pre-allocation may be a procedure for creating a template worker composed of a common base-runtime image for worker execution and minimal resource capacity, and may be processed through template worker scaling by the worker scaler. Thereafter, second-step pre-allocation is a procedure for changing the template worker created at the first step to a ready worker for actually executing a function, and may be processed through ready worker upscaling by the worker scaler.

Also, the worker scheduler 2140 may manage operation information through a database (DB) table, such as Worker Scheduler (WS) metadata so as to control the above-described operation.

In accordance with the present invention, there can be provided worker-scheduling technology that rapidly allocates container-based workers that perform a function service, and that minimizes response costs.

Further, the present invention may provide worker-scheduling technology that can actively respond to variation in the load of function service requests and can minimize an allocation latency for a short-term function service requiring a fast response speed.

Furthermore, the present invention may provide new worker-scheduling technology that suitably distributes execution preparation loads of workers related to the execution of a function in advance, thus making a FaaS platform more suitable for a real-time processing environment.

Furthermore, the present invention may process a worker allocation task in a distributed manner as two-step pre-allocation schemes before a worker allocation request occurs, and may pre-allocate workers required for a service using a function request period and a function execution time, thus minimizing scheduling costs incurred by worker allocation requests.

Furthermore, the present invention may provide a worker scheduler having greatly improved worker allocation costs, which is applicable to systems requiring a resource-isolation virtual cloud infrastructure service and to a medical AI-specialized training/inferencing platform shared by multiple institutions.

As described above, in the worker-scheduling method in a cloud-computing system and the apparatus for the worker-scheduling method according to the present invention, the configurations and schemes in the above-described embodiments are not limitedly applied, and some or all of the above embodiments can be selectively combined and configured so that various modifications are possible.

What is claimed is:

1. A method executed in a cloud-computing system, comprising:
    creating a template worker list comprising a plurality of template workers to process worker execution preparation loads in a distributed manner before a worker allocation request for execution of a particular function of a plurality of functions is received;
    calculating a first value by dividing an average execution time of total active workers in an active worker list that will execute the particular function by a worker allocation request period for each of the plurality of functions;
    calculating a second value by subtracting, from the first value, an initial number of active workers in the active worker list and a required number of ready workers to be allocated to the active worker list during a unit time for each of the plurality of functions;
    changing a subset equal to the second value of template workers in the template worker list to a first set of active workers and allocating the first set to the active worker list;
    changing the required number of ready workers to a second set of active workers and allocating the second set to the active worker list;
    receiving the worker allocation request for the execution of the particular function; and
    processing the worker execution preparation loads in the distributed manner in the cloud-computing system by executing the particular function by the total active workers in the active worker list, wherein the total active workers in the active worker list comprises the initial active workers, the first set of active workers, and the second set of active workers.

2. The method of claim 1, further comprising:
    initializing and changing any ready workers that are not used during a preset idle time into template workers.

3. The method of claim 1, wherein each of the template workers corresponds to a temporary worker configured by a base-runtime image and a minimum resource capacity so that each of the template workers is capable of being used by all of the plurality of functions.

4. The method of claim 1, wherein each of the ready workers corresponds to a worker in a function-execution-ready state when resource information for execution of the particular function is set and resource allocation is complete.

5. The method of claim 4, wherein each of the ready workers has a state corresponding to any one of an active ready state when the resource allocation and loading of the function are complete, and an inactive ready state when the resource is not allocated, but loading of the function is complete.

6. The method of claim 5, further comprising:
    when an active worker usage ratio is greater than a preset active upper reference value, performing ready worker upscaling by changing one or more template workers to one or more ready workers; and
    when the active worker usage ratio is less than a preset active lower reference value, changing a state of a ready worker in the active ready state to the inactive ready state.

7. The method of claim 6, wherein the active worker usage ratio is a ratio of a number of active workers to a sum of ready workers in the active ready state and the number of active workers.

8. The method of claim 5, further comprising:
    when an inactive worker ratio is greater than a preset inactive upper reference value, performing ready worker downscaling by changing a ready worker in the inactive ready state to a template worker.

9. The method of claim 1, further comprising:
    when a number of template workers is less than or equal to a preset maximum number of creatable workers, creating additional template workers by performing template worker upscaling.

10. An apparatus in a cloud-computing system, comprising:
    a memory; and
    a processor configured to execute instructions stored on the memory comprising:
        creating a template worker list comprising a plurality of template workers to process worker execution preparation loads in a distributed manner before a worker allocation request for execution of a particular function of a plurality of functions is received;

calculating a first value by dividing an average execution time of total active workers in an active worker list that will execute the particular function by a worker allocation request period for each of the plurality of functions;

calculating a second value by subtracting, from the first value, an initial number of active workers in the active worker list and a required number of ready workers to be allocated to the active worker list during a unit time for each of the plurality of functions;

changing a subset equal to the second value of template workers in the template worker list to a first set of active workers and allocating the first set to the active worker list;

changing the required number of ready workers to a second set of active workers and allocating the second set to the active worker list;

receiving the worker allocation request for the execution of the particular function; and processing the worker execution preparation loads in the distributed manner in the cloud-computing system by executing the particular function by the total active workers in the active worker list, wherein the total active workers in the active worker list comprises the initial active workers, the first set of active workers, and the second set of active workers.

11. The apparatus of claim 10, wherein the processor is further configured to execute instructions comprising:

initializing and changing ready workers that are not used during a preset idle time into template workers.

12. The apparatus of claim 10, wherein:

each of the template workers corresponds to a temporary worker configured by a base-runtime image and a minimum resource capacity so that each of the template workers is capable of being used by all of the plurality of functions, and each of the ready workers corresponds to a worker in a function-execution-ready state when resource information for execution of the function is set and resource allocation is complete.

13. The apparatus of claim 12, wherein:

each of the ready workers has a state corresponding to any one of an active ready state when the resource allocation and loading of the particular function are complete, and an inactive ready state when a resource is not allocated, but loading of the particular function is complete.

14. The apparatus of claim 13, wherein the processor is further configured to execute instructions comprising:

when an active worker usage ratio is greater than a preset active upper reference value, perform ready worker upscaling by changing one or more template workers to one or more ready workers, and when the active worker usage ratio is less than a preset active lower reference value, change a state of a ready worker in the active ready state to the inactive ready state.

15. The apparatus of claim 14, wherein the active worker usage ratio is a ratio of a number of active workers to a sum of ready workers in the active ready state and the number of active workers.

16. The apparatus of claim 13, wherein the processor is further configured to execute instructions comprising:

when an inactive worker ratio is greater than a preset inactive upper reference value, perform ready worker downscaling by changing a ready worker in the inactive ready state to a template worker.

* * * * *